(12) United States Patent
Hoffman

(10) Patent No.: US 7,122,252 B2
(45) Date of Patent: *Oct. 17, 2006

(54) HIGH SHADING PERFORMANCE COATINGS

(75) Inventor: Wayne L. Hoffman, Spring Green, WI (US)

(73) Assignee: Cardinal CG Company, Eden Prairie, MN (US)

( * ) Notice: Subject to any disclaimer, the term of this patent is extended or adjusted under 35 U.S.C. 154(b) by 398 days.

This patent is subject to a terminal disclaimer.

(21) Appl. No.: 10/438,283

(22) Filed: May 14, 2003

(65) Prior Publication Data

US 2004/0016202 A1  Jan. 29, 2004

Related U.S. Application Data

(60) Provisional application No. 60/381,216, filed on May 16, 2002.

(51) Int. Cl.
*B32B 17/06* (2006.01)

(52) U.S. Cl. .......... 428/432; 428/428; 428/697; 428/698; 428/699; 428/701; 428/702

(58) Field of Classification Search .......... 428/428, 428/433, 434, 697, 698, 699, 701, 702, 704
See application file for complete search history.

(56) References Cited

U.S. PATENT DOCUMENTS

| 2,207,656 | A | 7/1940 | Cartwright | 359/580 |
|---|---|---|---|---|
| 3,516,720 | A | 6/1970 | Mauer | 359/360 |
| 3,537,944 | A | 11/1970 | Gubb | 428/34 |
| 3,682,528 | A | 8/1972 | Apfel et al. | 350/1 |
| 3,781,077 | A | 12/1973 | Groth | 359/360 |
| 3,978,272 | A | 8/1976 | Donley | 428/434 |
| 3,978,273 | A | 8/1976 | Groth | 428/434 |
| 3,990,784 | A | 11/1976 | Gelber | 350/166 |
| 4,098,956 | A | 7/1978 | Blickensderfer | 428/627 |
| 4,235,048 | A | 11/1980 | Gillery | 49/390 |
| 4,313,647 | A | 2/1982 | Takazawa | 359/588 |
| 4,327,967 | A | 5/1982 | Groth | 350/258 |
| 4,348,453 | A | 9/1982 | Cohen | 428/333 |
| 4,413,877 | A | 11/1983 | Suzuki et al. | 350/1.7 |
| 4,440,822 | A | 4/1984 | Gordon | 428/216 |
| 4,462,883 | A | 7/1984 | Hart | 204/192 C |
| 4,487,197 | A | 12/1984 | Hoyois | 359/360 |
| 4,497,700 | A | 2/1985 | Groth | 204/192 |
| 4,534,841 | A | 8/1985 | Hartig et al. | 204/192 P |
| 4,548,691 | A | 10/1985 | Dietrich et al. | 204/192 P |
| 4,583,815 | A | 4/1986 | Taga et al. | 350/1.6 |
| 4,610,771 | A | 9/1986 | Gillery | 204/192 |
| 4,639,069 | A | 1/1987 | Yatabe | 359/360 |
| 4,735,488 | A | 4/1988 | Rancourt | 359/586 |
| 4,786,784 | A | 11/1988 | Nikodem et al. | 219/543 |
| 4,790,922 | A | 12/1988 | Huffer | 204/192.27 |
| 4,806,220 | A | 2/1989 | Finley | 204/192.27 |

(Continued)

FOREIGN PATENT DOCUMENTS

AU  0048985  2/2001  .......... 5/28

(Continued)

*Primary Examiner*—Jennifer C. McNeil
*Assistant Examiner*—G. Blackwell
(74) *Attorney, Agent, or Firm*—Fredrikson & Byron, PA

(57) ABSTRACT

The invention provides high shading performance, low-emissivity coatings. The invention provides a monolithic pane bearing a high shading performance, low-emissivity coating. The invention also provides an insulating glass unit bearing a high shading performance, low-emissivity coating. Finally, the invention provides methods of producing coated substrates by depositing high shading performance, low-emissivity coatings.

44 Claims, 6 Drawing Sheets

U.S. PATENT DOCUMENTS

| | | | |
|---|---|---|---|
| 4,834,857 A | 5/1989 | Gillery | 204/192.27 |
| 4,847,157 A | 7/1989 | Goodman et al. | 428/426 |
| 4,847,158 A | 7/1989 | Gillery | 428/433 |
| 4,883,721 A | 11/1989 | Nalepka et al. | 428/623 |
| 4,896,928 A | 1/1990 | Perilloux et al. | 350/1.6 |
| 4,898,789 A | 2/1990 | Finley | 428/623 |
| 4,902,081 A | 2/1990 | Huffer | 350/1.7 |
| 4,902,580 A | 2/1990 | Gillery | 428/623 |
| 4,902,581 A | 2/1990 | Criss | 428/627 |
| 4,919,778 A | 4/1990 | Dietrich et al. | 204/192.27 |
| 4,964,963 A | 10/1990 | Criss | 204/192 |
| 4,971,843 A | 11/1990 | Michelotti et al. | 428/34 |
| 4,985,312 A | 1/1991 | Furuya et al. | 428/627 |
| 4,996,105 A | 2/1991 | Oyama | 428/336 |
| 4,997,013 A | 3/1991 | Peckels | 141/95 |
| 5,055,358 A | 10/1991 | Livingston | 428/433 |
| 5,059,295 A | 10/1991 | Finley | 204/192.27 |
| 5,059,458 A | 10/1991 | Goodall | 428/34 |
| 5,073,451 A | 12/1991 | Iida | 428/336 |
| 5,087,525 A | 2/1992 | Goodman et al. | 428/428 |
| 5,110,662 A | 5/1992 | Depauw et al. | 428/192 |
| 5,112,693 A | 5/1992 | Gillery | 428/432 |
| 5,173,800 A | 12/1992 | King | 359/360 |
| 5,214,530 A | 5/1993 | Coombs | 359/359 |
| 5,216,542 A | 6/1993 | Szczyrbowski | 359/588 |
| 5,229,881 A | 7/1993 | Day et al. | 359/360 |
| 5,298,048 A | 3/1994 | Lingle et al. | 65/60.2 |
| 5,302,449 A | 4/1994 | Eby et al. | 428/336 |
| 5,306,547 A | 4/1994 | Hood | 428/213 |
| 5,334,718 A | 8/1994 | Thomas | 546/118 |
| 5,337,191 A | 8/1994 | Austin | 359/885 |
| 5,348,805 A | 9/1994 | Zagdoun et al. | 428/432 |
| 5,376,455 A | 12/1994 | Hartig et al. | 428/428 |
| 5,377,045 A | 12/1994 | Wolfe et al. | 359/585 |
| 5,450,238 A | 9/1995 | Bjornard | 359/580 |
| 5,514,476 A | 5/1996 | Hartig et al. | 428/426 |
| 5,520,996 A | 5/1996 | Balian et al. | 428/216 |
| 5,543,229 A | 8/1996 | Ohsaki et al. | 428/432 |
| 5,552,180 A | 9/1996 | Finley et al. | 427/165 |
| 5,557,462 A | 9/1996 | Hartig et al. | 359/585 |
| 5,563,734 A | 10/1996 | Wolfe et al. | 359/360 |
| 5,584,902 A | 12/1996 | Hartig et al. | 65/32.4 |
| 5,595,825 A | 1/1997 | Guiselin | 428/428 |
| 5,635,287 A | 6/1997 | Balian et al. | 428/216 |
| 5,691,044 A | 11/1997 | Oyama | 428/216 |
| 5,693,415 A | 12/1997 | Zait et al. | 428/332 |
| 5,750,265 A | 5/1998 | Goodman | 428/432 |
| 5,770,321 A | 6/1998 | Hartig et al. | 428/622 |
| 5,776,603 A | 7/1998 | Zagdoun | 428/336 |
| 5,780,149 A | 7/1998 | McCurdy et al. | 428/336 |
| 5,800,933 A | 9/1998 | Hartig et al. | 428/622 |
| 5,821,001 A | 10/1998 | Arbab et al. | 428/623 |
| 5,837,361 A | 11/1998 | Glaser et al. | 428/216 |
| 5,891,556 A | 4/1999 | Anderson | 428/216 |
| 5,897,857 A | 4/1999 | Hillebrand | 424/703 |
| 5,897,957 A | 4/1999 | Goodman | 428/432 |
| 5,902,505 A | 5/1999 | Finley | 219/547 |
| 5,938,898 A | 8/1999 | Ando | 204/192.23 |
| 5,942,319 A | 8/1999 | Oyama | 428/216 |
| 5,942,338 A | 8/1999 | Arbab et al. | 428/623 |
| RE36,308 E | 9/1999 | Yang | 359/585 |
| 5,948,538 A | 9/1999 | Brochot et al. | 428/432 |
| 5,952,084 A | 9/1999 | Anderson et al. | 428/212 |
| 5,965,246 A | 10/1999 | Guiselin et al. | 428/212 |
| 6,007,901 A | 12/1999 | Maschwitz et al. | 428/216 |
| 6,014,872 A | 1/2000 | Hartig et al. | 65/58 |
| 6,020,077 A | 2/2000 | Schicht et al. | 428/622 |
| 6,030,671 A | 2/2000 | Yang et al. | 428/34 |
| 6,034,813 A | 3/2000 | Woodard et al. | 359/360 |
| 6,042,934 A | 3/2000 | Guiselin et al. | 428/213 |
| 6,045,896 A | 4/2000 | Boire et al. | 428/216 |
| 6,048,621 A | 4/2000 | Gallego | 428/432 |
| 6,059,909 A | 5/2000 | Hartig et al. | 156/109 |
| 6,060,178 A | 5/2000 | Krisko et al. | 428/627 |
| 6,074,730 A | 6/2000 | Laird et al. | 428/212 |
| 6,124,026 A | 9/2000 | McCurdy et al. | 428/216 |
| 6,132,881 A | 10/2000 | Hartig et al. | 428/432 |
| 6,150,028 A | 11/2000 | Mazon | 428/426 |
| 6,154,598 A | 11/2000 | Gavrilovic et al. | 385/141 |
| 6,159,607 A | 12/2000 | Hartig et al. | 428/426 |
| 6,159,621 A | 12/2000 | Schicht et al. | 428/633 |
| 6,165,598 A | 12/2000 | Nelson | 428/212 |
| 6,174,599 B1 | 1/2001 | Boire et al. | 428/336 |
| 6,188,512 B1 | 2/2001 | Woodard | 359/359 |
| 6,190,776 B1 | 2/2001 | Demiryont | 428/434 |
| 6,210,784 B1 | 4/2001 | Rondeau et al. | 428/212 |
| 6,218,018 B1 | 4/2001 | McKown et al. | 428/432 |
| 6,231,992 B1 | 5/2001 | Niebauer | 428/472 |
| 6,231,999 B1 | 5/2001 | Krisko | 428/627 |
| 6,246,523 B1 | 6/2001 | Bradley | 359/585 |
| 6,262,830 B1 | 7/2001 | Scalora | 359/248 |
| 6,266,193 B1 | 7/2001 | Saif et al. | 359/582 |
| 6,274,244 B1 | 8/2001 | Finley et al. | 428/433 |
| 6,284,385 B1 | 9/2001 | Guillaumon et al. | 428/450 |
| 6,287,675 B1 | 9/2001 | Guiselin et al. | 428/313 |
| 6,306,525 B1 | 10/2001 | Schicht | 428/633 |
| 6,322,881 B1 | 11/2001 | Boire et al. | 428/216 |
| 6,335,142 B1 | 1/2002 | Quesnel | 430/275.1 |
| 6,337,124 B1 | 1/2002 | Anderson | 428/216 |
| 6,344,288 B1 | 2/2002 | Oyama | 428/701 |
| 6,355,334 B1 | 3/2002 | Rondeau et al. | 428/212 |
| 6,650,478 B1 | 11/2003 | DeBusk | 359/585 |
| 6,838,159 B1 | 1/2005 | Eby | 428/216 |
| 2001/0003628 A1 | 6/2001 | Demiryont | 428/630 |
| 2001/0006734 A1 | 7/2001 | Demiryont | 428/432 |
| 2001/0021540 A1 | 9/2001 | Woodard | 438/98 |
| 2001/0044032 A1 | 11/2001 | Finley et al. | 428/433 |
| 2001/0053439 A1 | 12/2001 | Guiselin et al. | 428/213 |
| 2002/0009601 A1 | 1/2002 | Stachowiak | 428/432 |
| 2002/0016250 A1 | 2/2002 | Hayakawa et al. | 502/5 |
| 2002/0034641 A1 | 3/2002 | Ebisawa et al. | 428/426 |
| 2002/0037414 A1 | 3/2002 | Cunningham | 428/412 |
| 2002/0037421 A1 | 3/2002 | Arnaud et al. | 428/472 |
| 2002/0045037 A1 | 4/2002 | Boire et al. | 428/216 |
| 2002/0136905 A1 | 9/2002 | Medwick et al. | 428/432 |
| 2003/0049464 A1 | 3/2003 | Glenn et al. | 428/432 |
| 2003/0148115 A1 | 8/2003 | Glenn et al. | 428/432 |
| 2003/0165693 A1 | 9/2003 | Hartig et al. | 428/426 |
| 2003/0165694 A1 | 9/2003 | Hartig et al. | 428/428 |
| 2003/0186064 A1 | 10/2003 | Murata et al. | 428/432 |
| 2004/0009356 A1 | 1/2004 | Medwick | 428/432 |
| 2004/0071985 A1 | 4/2004 | Krisko | 428/434 |
| 2004/0241457 A1 | 12/2004 | Macquart | 428/432 |
| 2004/0247929 A1 | 12/2004 | Buhay | 428/621 |
| 2005/0123772 A1 | 6/2005 | Coustet | 428/432 |

FOREIGN PATENT DOCUMENTS

| | | | |
|---|---|---|---|
| EP | 0847965 | 12/1997 | |
| EP | 0341002 | 2/1999 | 19/8 |
| EP | 1044934 | 10/2000 | 17/36 |
| EP | 1329307 | 7/2003 | |
| WO | WO 9748649 | 12/1997 | |
| WO | WO 99/58736 A2 | 11/1999 | |
| WO | WO 02/18132 | 3/2002 | |
| WO | WO 0226488 | 4/2002 | |
| WO | WO 02/48065 | 6/2002 | 17/36 |
| WO | WO 03074442 | 9/2003 | |
| WO | WO 03074441 | 12/2003 | |

HIGH SHADING PERFORMANCE COATINGS

RELATED APPLICATIONS

This application claims priority to U.S. Provisional Patent Application No. 60/381,216, filed May 16, 2002, which is incorporated herein by reference.

FIELD OF THE INVENTION

The present invention provides coatings for glass and other substrates. More particularly, this invention provides coatings that offer high shading performance. The invention also provides methods for producing coatings of this nature, as well as IG units, monolithic panes, and other substrates bearing these coatings.

BACKGROUND OF THE INVENTION

Low-emissivity coatings are well known in the present art. Typically, they include one or more infrared-reflective films each positioned between two or more transparent dielectric films. The infrared-reflective films, which are typically conductive metals such as silver, gold, or copper, reduce the transmission of radiant heat through the coating (e.g., by reflecting infrared radiation). The transparent dielectric films are used primarily to reduce visible reflectance and to control other properties of the coating, such as color. Commonly used transparent dielectrics include oxides of zinc, tin, and titanium, as well as nitrides such as silicon nitride. Low-emissivity coatings are commonly deposited on glass using well known magnetron sputtering techniques.

In addition to the infrared reflection provided by low-emissivity coatings, these coatings can be engineered to provide desired shading properties. As is well known, the solar heat gain coefficient (SHGC) of a window is the fraction of incident solar radiation that is admitted through a window. There are a number of applications where low solar heat gain windows are of particular benefit. In warm climates, it is especially desirable to have low solar heat gain windows. For example, solar heat gain coefficients of about 0.4 and below are generally recommended for buildings in the southern United States. Further, windows that are exposed to a lot of undesirable sun benefit from having a low solar heat gain coefficient. For example, windows on the east or west side of a building tend to get a lot of sun in the morning and afternoon. For applications like these, the solar heat gain coefficient of a window plays a vital role in maintaining a comfortable environment within the building. Thus, it is beneficial to provide windows of this nature with coatings that establish a low solar heat gain coefficient (i.e., high shading ability coatings).

A tradeoff is sometimes made in high shading ability coatings whereby the films selected to achieve a low SHGC have the effect of restricting the visible reflectance to a higher level than is ideal. As a consequence, windows bearing these coatings may have a somewhat mirror-like appearance. It would be desirable to provide a high shading ability coating that has sufficiently low visible reflectance to obviate this mirror-like appearance problem.

In addition to having undesirably high visible reflectance, the transmitted and reflected colors of conventional high shading ability coatings tend not to be ideal. For example, these coatings commonly exhibit hues that are more red and/or yellow than is desired. To the extent a coating has a colored appearance, it is pleasing if the coating exhibits a transmitted and/or reflected hue that is blue or blue-green. The chroma of these coatings tends also to be greater than is desired. In most cases, it is preferable to provide a coating that is as color neutral (i.e., colorless) as possible. Thus, the reflected and transmitted colors of conventional low solar heat gain coatings tend to be less than ideal, both in terms of hue and chroma.

It would be desirable to provide low-emissivity coatings that offer a low solar heat gain coefficient. It would be particularly desirable to provide low-emissivity coatings that offer low visible reflectance as well as a low solar heat gain coefficient. Further, it would be particularly desirable to provide low-emissivity coatings that exhibit pleasing colors in reflection and/or transmission and also offer a low solar heat gain coefficient. It would be especially desirable to provide low-emissivity coatings that offer a low solar heat gain coefficient, low visible reflectance, and also exhibit pleasing colors in reflection and/or transmission.

SUMMARY OF THE INVENTION

In certain embodiments, the invention provides a transparent substrate bearing a high shading performance, low-emissivity coating. In these embodiments, the coating comprises, in sequence outwardly: a first infrared-reflective film having a thickness of between about 76 Å and about 122 Å; a first high absorption blocker layer positioned directly over the first infrared-reflective film, the first high absorption blocker layer comprising a metallic film selected from the group consisting of niobium, titanium, and niobium-titanium, wherein the first high absorption blocker layer has a thickness of between about 38 Å and about 69 Å; a second infrared-reflective film having a thickness of between about 119 Å and about 184 Å; and a second high absorption blocker layer positioned directly over the second infrared-reflective film, the second high absorption blocker layer comprising a metallic film selected from the group consisting of niobium, titanium, niobium-titanium, wherein the second high absorption blocker layer has a thickness of between about 29 Å and about 63 Å. In some embodiments of this nature, the first and second infrared-reflective films have a combined thickness of between about 209 Å and about 293 Å. In some cases, the first and second high absorption blocker layers have a combined thickness of between about 72 Å and about 110 Å. Preferably, the first and second infrared-reflective films have a combined thickness of between about 233 Å and about 266 Å, and the first and second high absorption blocker layers have a combined thickness of between about 80 Å and about 100 Å. In some of the present embodiments, the coating includes an inner coat (comprising at least one transparent dielectric layer) between the substrate and the first infrared-reflective film, a middle coat (comprising at least one transparent dielectric layer) between the first high absorption blocker layer and the second infrared-reflective film, and an outer coat (comprising at least one transparent dielectric layer) further from the substrate than the second high absorption blocker layer, wherein the inner coat has an optical thickness of between about 192 Å and about 290 Å, the middle coat has an optical thickness of between about 1070 Å and about 1410 Å, and the outer coat has an optical thickness of between about 530 Å and about 568 Å.

In certain embodiments, the invention provides an insulating glass unit comprising first and second panes held in a spaced-apart configuration. The panes have confronting inner surfaces oriented toward a between-pane space and opposed outer surfaces oriented away from the between-pane space. One of the inner surfaces bears a high shading performance, low-emissivity coating. The coating comprises first and second infrared-reflective films and first and second high absorption blocker layers positioned respectively directly over the first and second infrared-reflective films. Each of the high absorption blocker layers comprises a metallic film selected from the group consisting of niobium, titanium, and niobium-titanium. In the present embodiments, the insulating glass unit has a total visible transmittance of between about 0.36 and about 0.44.

In certain embodiments, the invention provides an insulating glass unit comprising first and second panes held in a spaced-apart configuration. The panes have confronting inner surfaces oriented toward a between-pane space and opposed outer surfaces oriented away from the between-pane space. One of the inner surfaces bears a high shading performance, low-emissivity coating. The coating comprises first and second infrared-reflective films and first and second high absorption blocker layers positioned respectively directly over the first and second infrared-reflective films. Each of the high absorption blocker layers comprises a metallic film selected from the group consisting of niobium, titanium, and niobium-titanium. In the present embodiments, the insulating glass unit has a solar heat gain coefficient of less than about 0.3.

In certain embodiments, the invention provides a method of producing coated substrates. The method comprises providing a pane having generally-opposed first and second major surfaces and depositing upon one of the major surfaces (i.e., upon a desired surface) a low-emissivity coating. The coating is deposited by applying the following films, in sequence outwardly (i.e., away from the desired surface): a first infrared-reflective film deposited at a thickness of between about 76 Å and about 122 Å; a first high absorption blocker layer deposited directly over the first infrared-reflective film, the first high absorption blocker layer being deposited as a metallic film selected from the group consisting of niobium, titanium, and niobium-titanium, wherein the first high absorption blocker layer is deposited at a thickness of between about 38 Å and about 69 Å; a second infrared-reflective film deposited at a thickness of between about 119 Å and about 184 Å; and a second high absorption blocker layer deposited directly over the second infrared-reflective film, the second high absorption blocker layer being deposited as a metallic film selected from the group consisting of niobium, titanium, niobium-titanium, wherein the second high absorption blocker layer is deposited at a thickness of between about 29 Å and about 63 Å. In some cases, the first and second infrared-reflective films are deposited at a combined thickness of between about 233 Å and about 266 Å, and the first and second high absorption blocker layers are deposited at a combined thickness of between about 80 Å and about 100 Å. In some of the present embodiments, the method further comprises depositing an inner coat between the substrate and the first infrared-reflective film, depositing a middle coat between the first high absorption blocker layer and the second infrared-reflective film, and depositing an outer coat further from the substrate than the second high absorption blocker layer. In certain preferred embodiments, the inner coat is deposited at an optical thickness of between about 192 Å and about 290 Å, the middle coat is deposited at an optical thickness of between about 1070 Å and about 1410 Å, and the outer coat is deposited at an optical thickness of between about 530 Å and about 568 Å. In some such preferred embodiments, the first and second high absorption blocker layers are both deposited as films consisting essentially of metallic titanium.

Conjointly, the first and second infrared-reflective layers can be advantageously both deposited as films consisting essentially of silver. In some cases, the middle coat is deposited directly over the first high absorption blocker layer, and the outer coat is deposited directly over the second high absorption blocker layer.

DETAILED DESCRIPTION OF PREFERRED EMBODIMENTS

Figure 1:
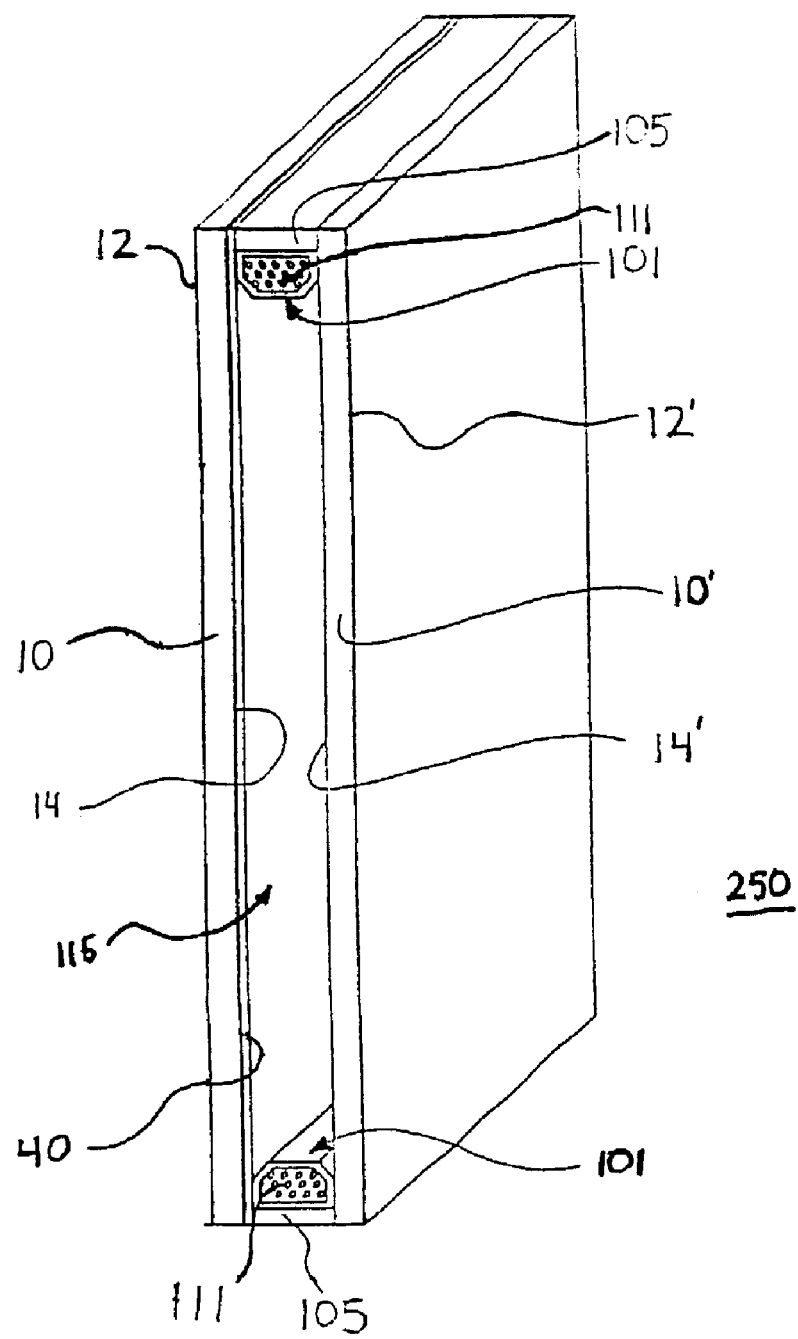
FIG. 1 is a perspective view of an insulating glass unit bearing a high shading performance coating in accordance with certain embodiments of the present invention.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

A variety of substrates are suitable for use in the present invention. In most cases, the substrate 10 is a sheet of transparent material (i.e., a transparent sheet). However, the substrate 10 is not required to be transparent. For example, opaque substrates may be useful in some cases. However, it is anticipated that for most applications, the substrate will comprise a transparent or translucent material, such as glass or clear plastic. In many cases, the substrate 10 will be a glass pane. A variety of known glass types can be used, and soda lime glass is expected to be preferred.

Tinted glass can optionally be used in certain embodiments of the invention. Many suitable types of tinted glass are available from well known glass suppliers. Thus, a high shading performance coating of the invention can be applied to a pane of tinted glass, if so desired. For example, the high shading performance coating can be applied to a pane of tinted glass, and this coated pane can be incorporated (e.g., as an outboard pane) into a multiple pane insulating glass unit (or "IG unit") that also includes at least one pane (e.g., an inboard pane) of clear glass. While embodiments of this nature are contemplated, the high shading performance coating is particularly advantageous when used simply with clear glass.

In certain embodiments, the invention provides an IG unit that is provided with at least one high shading performance coating. IG units are well known in the present art. FIG. 1 depicts one example of an IG unit 8 that can be provided in accordance with the invention. The invention, however, is not limited to practice with any particular type of IG unit. To the contrary, all aspects of invention can be practiced with IG units of any type (e.g., all-glass units, vacuum units, etc.). Thus, the illustrated IG unit type is not to be construed as limiting to the invention. Further, while the term insulating "glass" unit is used throughout the present disclosure, it is to be understood that the panes need not be formed of glass.

The IG unit 8 shown in FIG. 1 includes a first pane 10 and a second pane 10', together forming a pair of spaced-apart panes. The panes 10, 10' bound a between-pane space 115 therebetween and an exterior space 250 thereabout. The panes have confronting inner surfaces 14, 14' oriented toward the between-pane space 115 and opposed outer surfaces 12, 12' oriented away from the between-panes space 115. In the embodiment of FIG. 1, the panes 10, 10' are held in a spaced-apart configuration (e.g., in a substantially parallel spaced-apart relationship) by a spacer 101. The spacer joins the peripheral inner surfaces of the panes. Thus, the spacer 101 and the confronting inner surfaces 14, 14' of the panes 10, 10' together define the between-pane space 115. Useful IG units, components thereof, and methods of manufacturing and using IG units are described in U.S. patent application Ser. No. 10/076,211, the entire teachings of which are incorporated herein by reference.

In the embodiment of FIG. 1, the illustrated IG unit 8 bears only one coating 40. However, other coatings can be provided on the IG unit 8, if so desired. For example, it may be desirable to provide a variety of different coatings on one or both outer surfaces 12, 12' of the IG unit 8. In certain embodiments, a hydrophilic coating (not shown) is provided on one or both outer surfaces 12, 12'. In one embodiment, the #1 surface (defined below) bears a hydrophilic coating, while the #2 surface (also defined below) bears the high shading performance coating. Useful hydrophilic coatings are disclosed in U.S. patent application Ser. Nos. 09/868, 542, 09/572,766, and 09/599,301, the entire teachings of each of which are incorporated herein by reference.

In certain other embodiments (not shown), the #1 surface bears a hydrophobic coating, while the #2 surface bears the high shading performance coating. Useful hydrophobic coatings are disclosed in U.S. Pat. No. 5,424,130 (Nakanishi et al), the entire teachings of which are incorporated herein by reference.

Further, certain embodiments (not shown) provide an IG unit wherein a photocatalytic coating is provided on one or both outer surfaces 12, 12'. In one embodiment, the #1 surface bears a photocatalytic coating, and the #2 surface bears the high shading performance coating. Useful photocatalytic coatings are described in U.S. Pat. No. 5,874,701 (Watanabe et al), U.S. Pat. No. 5,853,866 (Watanabe et al), U.S. Pat. No. 5,961,843 (Hayakawa et al.), U.S. Pat. No. 6,139,803 (Watanabe et al), U.S. Pat. No. 6,191,062 (Hayakawa et al.), U.S. Pat. No. 5,939,194 (Hashimoto et al.), U.S. Pat. No. 6,013,372 (Hayakawa et al.), U.S. Pat. No. 6,090,489 (Hayakawa et al.), U.S. Pat. No. 6,210,779 (Watanabe et al), U.S. Pat. No. 6,165,256 (Hayakawa et al.), and U.S. Pat. No. 5,616,532 (Heller et al.), the entire teachings of each of which are incorporated herein by reference.

Figure 6:
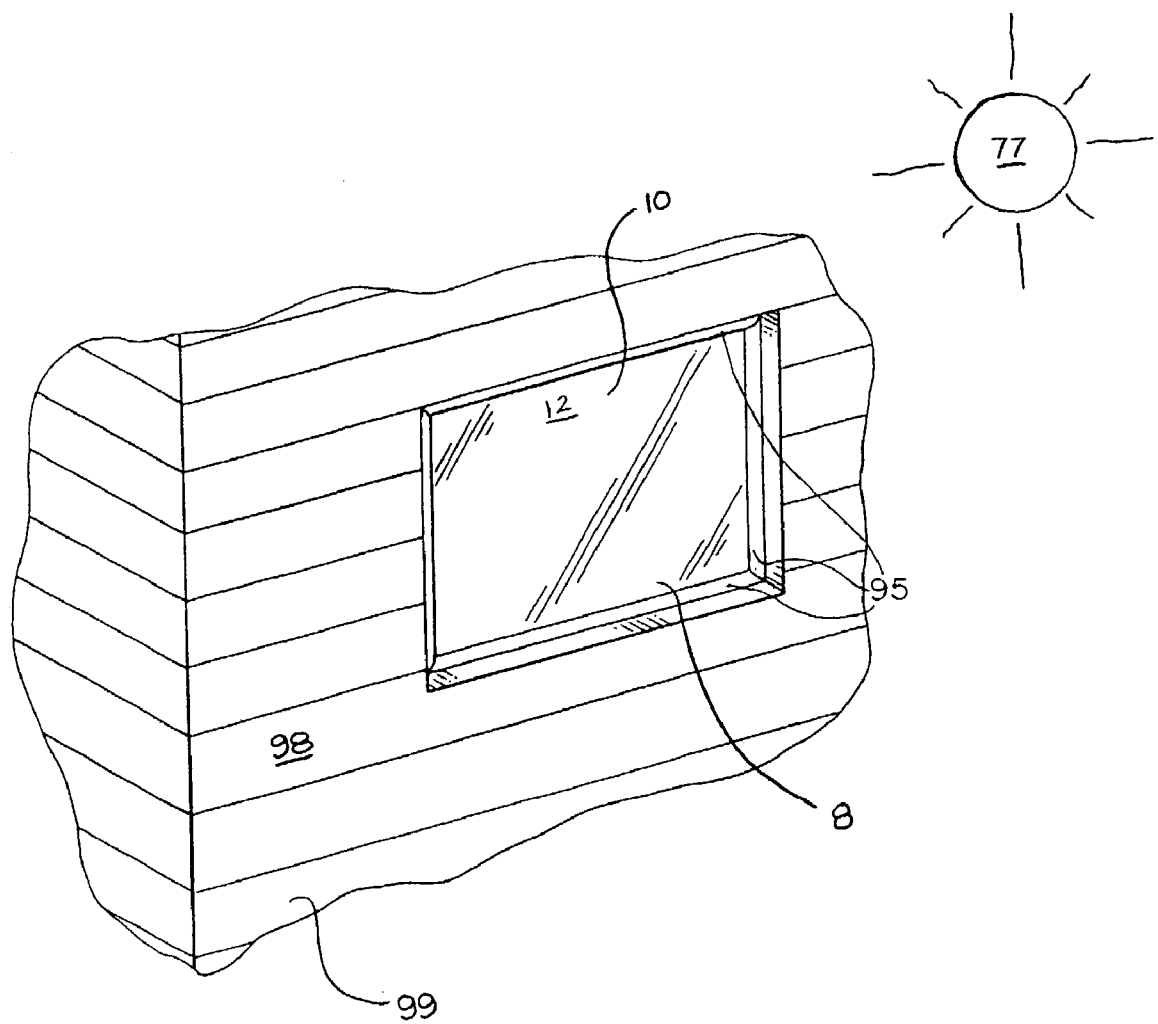
FIG. 6 is a perspective view of a glazing that bears a high shading performance coating and has been mounted on the outer wall of a building in accordance with certain embodiments of the invention.

The present high shading performance coating is preferably carried on the "second" surface of an IG unit. This is perhaps best appreciated with reference to FIG. 1 (wherein there is illustrated an IG unit 8) in view of FIG. 6 (wherein the IG unit is mounted on a frame in an exterior wall 98 of a building 99). Generally speaking, the "first" (or "#1") surface is that which faces (i.e., is exposed to) an outdoor environment. Accordingly, it is the #1 surface that radiation from the sun 77 first strikes. In FIG. 6, the outer surface 12 of the first pane 10 is the so-called first surface. Moving from the #1 surface toward the interior of the building 99, the next surface is the "second" (or "#2") surface. Thus, the inner surface 14 of the first pane 10 is the so-called second surface. Moving further toward the interior of the building 99, the next surface is the "third" (or "#3") surface, followed by the "fourth" (or "#4") surface. Thus, the inner surface 14' of the second pane 10' is the so-called third surface, and the outer surface 12' of this pane 10' is the so-called fourth surface.

The present high shading performance coating 40 has a number of particularly beneficial properties. The ensuing discussion reports several of these properties. In some cases, these properties are reported in the context of a single pane 10 bearing the present coating 40 on one surface 14. In other cases, these properties are reported in the context of an IG unit 8 having the present coating 40 on its #2 surface. In such cases, the reported properties have been determined for an IG unit wherein both panes are 3 mm soda lime float glass with a ½ inch between-pane space filled with an insulative gas mix of 90% argon and 10% air. Of course, these specifics are by no means limiting to the invention. Absent an express statement to the contrary, the present discussion reports determinations made using the well known Window 4.1 program under standard ASHRAE conditions.

The high shading performance coating 40 has exceptional shading ability. For example, the solar heat gain coefficient of the present IG unit 8 is extraordinarily low, even as compared to other high shading ability coatings. As is well known in the art, the solar heat gain coefficient (SHGC) of a window is the fraction of incident solar radiation that is admitted through the window. The term "solar heat gain coefficient" is used herein in accordance with its well known meaning. Reference is made to NFRC 200-93 (1993), the entire teachings of which are incorporated herein by reference.

As noted above, there are many applications where low solar heat gain windows are of particular benefit. In warm climates, for example, it is desirable to have low solar heat gain windows. Further, windows that are exposed to a lot of undesirable sun benefit from having a low solar heat gain coefficient. For example, windows on the east or west side of a building tend to get a lot of sun in the morning and afternoon. Thus, it is beneficial to provide windows of this nature with coatings that establish a low solar heat gain coefficient. For example, a solar heat gain coefficient of about 0.4 or less is commonly recommended for buildings in the southern United States and other warm climates.

The shading ability of the present coating 40 is particularly beneficial for warm climate applications. For example, the present IG unit 8 has a solar heat gain coefficient of less than about 0.4. In fact, the present IG unit 8 has a solar heat gain coefficient of less than about 0.3, and preferably less than about 0.27 (in particular less than 0.26). This is exceptionally low, even as compared to other high shading ability coatings. While the precise level of shading performance can be selected and varied in accordance with the teachings of this disclosure, certain preferred embodiments (e.g., where the coating 40 is one of the four uniquely preferred film stacks detailed below) provide an IG unit 8 having a solar heat gain coefficient of about 0.25. Thus, the present coating 40 is particularly beneficial when high shading ability is desired.

As noted above, the solar heat gain coefficient of the present coating 40 is exceptionally low, even for a high shading ability coating. Some high shading ability coatings achieve low levels of visible transmittance and yet fail to achieve a sufficiently low solar heat gain coefficient. For example, the layers added to a high shading ability coating may reduce visible transmittance without achieving a sufficiently low solar heat gain coefficient. A solar heat gain coefficient of less than about 0.27 (particularly on the order of about 0.25) is well below the level that would be expected to be possible for a high shading ability coating having the present combination of properties (e.g., exceptionally low emissivity, excellent reflected color, and exceptionally low visible reflectance).

Figure 4:
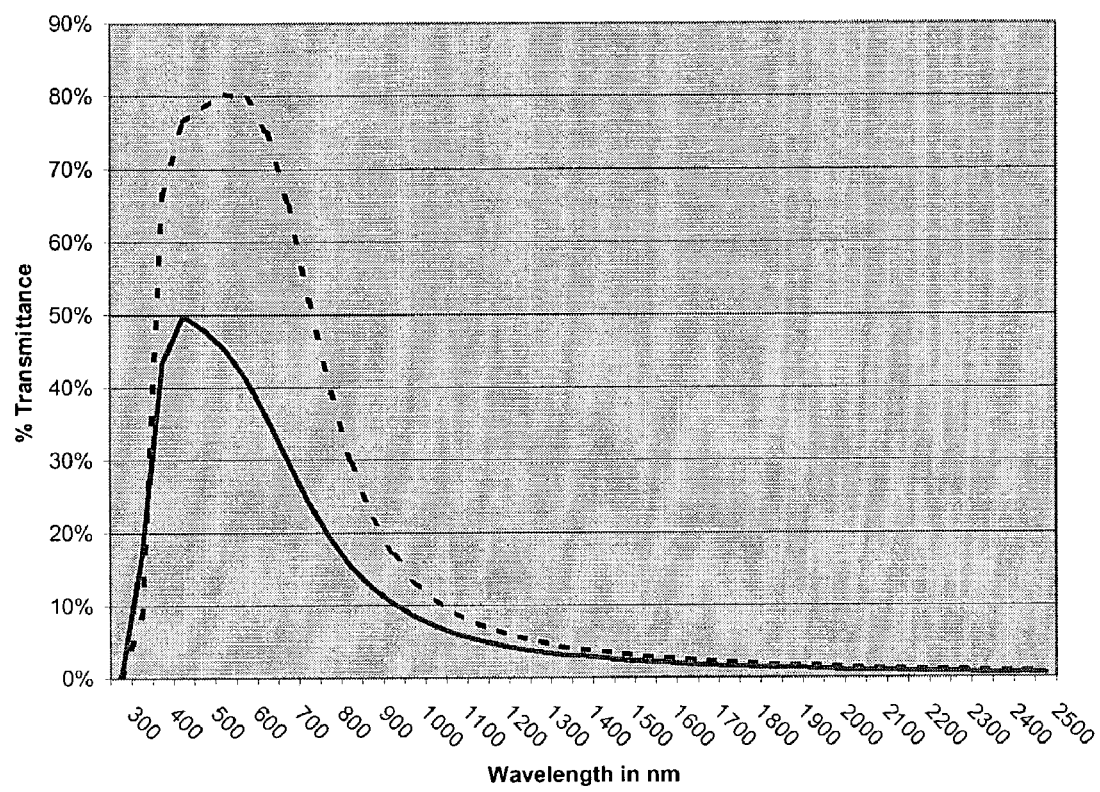
FIG. 4 is a graph of the solar transmittance of a pane bearing a high shading performance coating in accordance with certain embodiments of the invention.

The shading ability of the present coating 40 can also be appreciated with reference to FIG. 4, which graphs the transmission properties of a glass pane bearing the present coating 40 on one surface 14 (denoted by the solid line) relative to the transmission properties of a glass pane bearing a conventional double silver low-emissivity coating on one surface 14 (denoted by the dashed line). As can be seen, the transmittance of both panes is highest across the visible range of wavelengths and decreases sharply at wavelengths beyond the range of visible light. The maximum transmittance of the pane bearing the present coating 40 is much lower than that of the pane bearing the conventional double-silver coating. For example, the maximum transmittance of the pane bearing the present coating 40 is less than about 50% (e.g., about 49%), while the maximum transmittance of the pane bearing the conventional double-silver coating is about 80%. For some applications, such high visible transmission can create an environment that is perceived to be overly bright (the present coating 40 provides glare control as compared to high visible transmission coatings). Thus, the present coating 40 is particularly beneficial when high shading ability is desired.

The total visible transmission of the present IG unit 8 is typically between about 36% and about 44%. In contrast, an IG unit bearing a conventional double-silver low-emissivity coating would typically have a much higher total visible transmission (e.g., of about 65% or higher). While the precise level of visible transmission can be selected and varied in accordance with the teachings of this disclosure, certain preferred embodiments (e.g., where the coating 40 is one of the four uniquely preferred film stacks detailed below) provide an IG unit 8 having a total visible transmittance of between about 0.38 and about 0.42 (e.g., about 0.4).

Additional layers of metal are sometimes incorporated into high shading ability coatings to achieve low levels of visible transmittance. While these additional metal layers may establish low visible transmittance, they are an unnecessary complexity and are preferably avoided. With the present coating 40, exceptional shading properties can be achieved with no metal layers other than silver layers and blocker layers. Additional metal layers can make it exceedingly difficult, if not impossible, to obtain a well-balanced combination of coating properties, such as exceptionally low emissivity and exceptionally low solar heat gain coefficient in combination with excellent reflected color (e.g., largely gray in appearance) and low visible reflectance.

As noted above, a limitation of some high shading ability coatings is that they reflect more visible light than is optimal. A tradeoff is sometimes made in high shading ability coatings whereby the films selected to achieve a low SHGC have the effect of restricting the visible reflectance to a level that is higher than ideal. As a consequence, windows bearing these coatings may have a somewhat mirror-like appearance.

To the contrary, the high shading performance coating 40 has sufficiently low visible reflectance to obviate this mirror-like appearance problem. For example, the present IG unit 8 has an exterior visible reflectance $R_v$ (off the glass side of the first pane 10) of less than about 20%. In fact, the present IG unit 8 achieves an exterior visible reflectance $R_v$ of less than about 18% (in particular less than 15%). While the precise level of visible reflectance can be selected and varied in accordance with the present teachings, certain preferred embodiments (e.g., where the coating 40 is one of the four uniquely preferred film stacks detailed below) provide an IG unit 8 having an exterior visible reflectance $R_v$ of about 14%. In comparison, the visible reflectance of an IG unit having panes of clear uncoated glass would typically be about 15%.

The term "visible reflectance" is well known in the art. This term is used herein in accordance with its well-known meaning to refer to the percentage of all incident visible radiation that is reflected off the glass side of a monolithic pane (which bears the coating 40 on the opposite film side) or off the exterior of the present IG unit 8. Skilled artisans will appreciate that the visible reflectance off the glass side of a monolithic pane includes not only visible radiation reflected at the surface 12, but also visible radiation reflected at the surface 14. Likewise, the visible reflectance off the exterior side of the IG unit 8 includes not only visible radiation reflected at the surface 12, but also visible radiation reflected at surfaces 14, 14', and 12'. Visible radiation comprises the wavelength range of between about 380 nm and about 780 nm. The reported visible reflectance is measured off the a central portion of the glass side of the monolithic pane or off a central portion of the glass side of the outboard pane 10 of the present IG unit 8, and is indicated as $R_v$, where v stands for visible. Visible reflectance can be determined as specified in the above-noted "Standard Test Methods for Solar Energy Transmittance and Reflectance (Terrestrial) of Sheet Materials, ASTM".

In addition to these beneficial properties, the high shading performance coating 40 achieves color properties that are particularly pleasing. The present coating 40 is extremely well suited for applications in which reflected color is of concern. The present predominantly gray reflected color is extraordinary for any low-emissivity coating, especially for a high shading ability coating, much less one having the present combination of coating properties. The following discussion of color is reported using the well known color coordinates of "a" and "b". In particular, these color coordinates are indicated herein using the subscript h (i.e., $a_h$ and $b_h$) to represent the conventional use of the well known Hunter Lab Color System (Hunter methods/units, Ill. D65, 10 degree observer). The present color properties can be determined as specified in ASTM D-2244-93, "Standard Test Method For Calculation Of Color Differences From Instrumentally Measured Color Coordinates", Sep. 15, 1993, as augmented by ASTM E-308-85 Annual Book of ASTM Standards, Vol. 06.01 "Standard Method For Computing The Colors Of Objects By Using The CIE System", the entire teachings of each of which are incorporated herein by reference.

Figure 5:
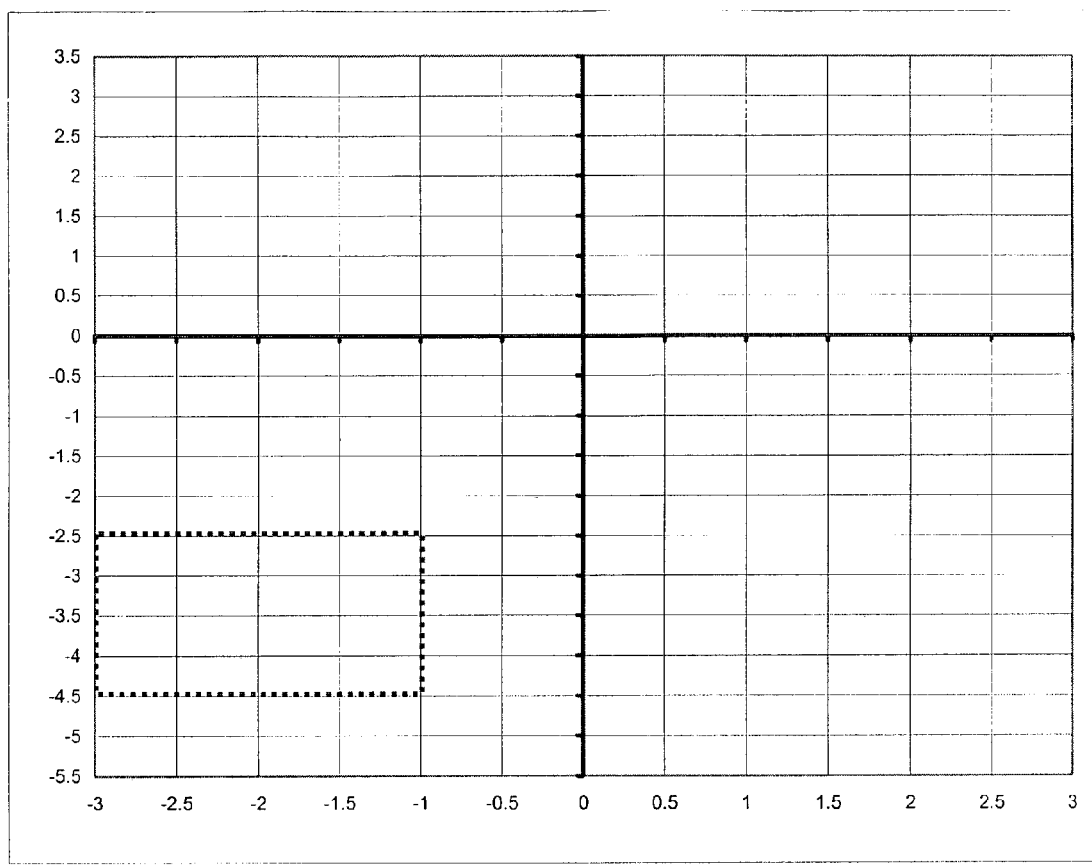
FIG. 5 is a graph of the reflected color of an insulating glass unit bearing a high shading performance coating in accordance with certain embodiments of the invention.

The present IG unit 8 has an exceptionally neutral (i.e., colorless) appearance in reflection, with any appreciable reflected color being of a particularly pleasing hue. The reflected color reported herein is as viewed from the exterior of the present IG unit 8 (i.e., off the glass side 12 of the outboard pane 10). The reflected hue of the present IG unit 8 is entirely within the blue-green range. In particular, the present IG unit 8 exhibits a reflected color characterized by an $a_h$ color coordinate of between about −0.75 and about −3.25 and a $b_h$ color coordinate of between about −2.25 and about −4.75. This reflected color range is an exceptional property of the present coating 40. While it is a commonly stated goal for coatings to achieve a generally light blue-green color, few high shading ability coatings actually achieve a pleasing color. The reflected color of the present coating 40 is exceptional in actual appearance and the chroma of its color is extraordinarily low. In certain preferred embodiments (e.g., where the coating 40 is one of the four uniquely preferred film stacks detailed below), the IG unit 8 exhibits a reflected color characterized by an $a_h$ color coordinate of between about −1 and about −3 (e.g., about −2) and a $b_h$ color coordinate of between about −2.5 and about −4.5 (e.g., about −3.5). This is shown in FIG. 5, wherein the reflected color of such an IG unit 8 is represented by the color range defined by the dashed lines. In this figure, it can be appreciated that the reflected $a_h$ and $b_h$ color values are entirely negative, such that the reflected hue is entirely within the blue-green range. Further, the magnitude of the $a_h$ and $b_h$ values is exceptionally low. The present IG unit 8 has a substantially colorless appearance in reflection, which looks primarily gray (this is an exceptional feature of the coating 40) with any appreciable hue being blue-green. The desirability of this color range on a qualitative level (in terms of the actual appearance of a window bearing this coating 40) is one of the most advantageous aspects of the present coating 40. This is apparent when viewing a window bearing the present coating 40 in comparison to windows bearing other high shading performance coatings.

In addition to the beneficial properties discussed above, the present IG unit 8 has desirable thermal insulating properties. The thermal insulating properties facilitated by the present coating 40 are exceptional, even as compared to other high shading ability coatings, especially one with the present combination of properties. As noted below, the high shading performance coating 40 includes two infrared-reflective films 50, 150. These films 50, 150 are highly reflective of infrared radiation (i.e., radiant heat). Since the infrared-reflective films 50, 150 are typically silver or another electrically conductive material, these films 50, 150 contribute low emissivity to the high shading performance coating 40. For example, the emissivity of the present coating 40 is less than about 0.1. In fact, the emissivity of this coating 40 is less than about 0.08 (in particular less than 0.06). While the precise level of emissivity can be selected and varied in accordance with the present teachings, a number of preferred coating embodiments (e.g., the four uniquely preferred film stacks detailed below) provide an emissivity of about 0.056.

The emissivity of the present coating 40 is exceptionally low, even as compared to other high shading ability coatings. High shading ability coatings sometimes achieve low levels of visible transmittance by means that restrict emissivity to higher than ideal levels. For example, the layers incorporated into a high shading ability coating may decrease the visible transmittance without achieving a sufficiently low emissivity. Emissivity of less than about 0.08 (particularly about 0.056) is well below the level that would be expected to be possible for a high shading ability coating having the present combination of properties (e.g., exceptionally low solar heat gain coefficient, excellent reflected color, and exceptionally low visible reflectance).

The term "emissivity" is well known in the present art. This term is used herein in accordance with its well-known meaning to refer to the ratio of radiation emitted by a surface to the radiation emitted by a blackbody at the same temperature. Emissivity is a characteristic of both absorption and reflectance. It is usually represented by the formula: E=1−Reflectance. The present emissivity values can be determined as specified in "Standard Test Method For Emittance Of Specular Surfaces Using Spectrometric Measurements" NFRC 301-93, the entire teachings of which are incorporated herein by reference.

The "U Value" of the present IG unit 8 is also exceptionally low, even as compared to other high shading ability coatings. As is well known, the U Value of an IG unit is a measure of the insulating property of the unit. The smaller the U value the better the insulating property of the unit. The U Value of the present IG unit 8 is less than about 0.4. In fact, the present IG unit 8 has U Value of less than about 0.3 (in particular less than 0.28). While the precise level of U Value can be selected and varied in accordance with the present teachings, certain preferred embodiments (e.g., where the coating 40 is one of the four uniquely preferred film stacks detailed below) provide an IG unit 8 wherein the U Value is about 0.26. In comparison, the U Value of an IG unit having panes of uncoated glass would typically be about 0.46. Thus, the present high shading performance coating 40 substantially lowers the U Value of the IG unit 8 (i.e., it substantially improves the thermal insulating property of the unit). The U Value of the present coating 40 is especially surprising given the exceptional combination of properties achieved by this coating 40.

The term U Value is well known in the art. It is used herein in accordance with its well-known meaning to express the amount of heat that passes through one unit of area in one unit of time for each unit of temperature difference between a hot side of the IG unit 8 and a cold side of the IG unit 8. The U Value can be determined in accordance with the standard specified for $U_{winter}$ in NFRC 100-91 (1991), the entire teachings of which are incorporated herein by reference.

Figure 2:
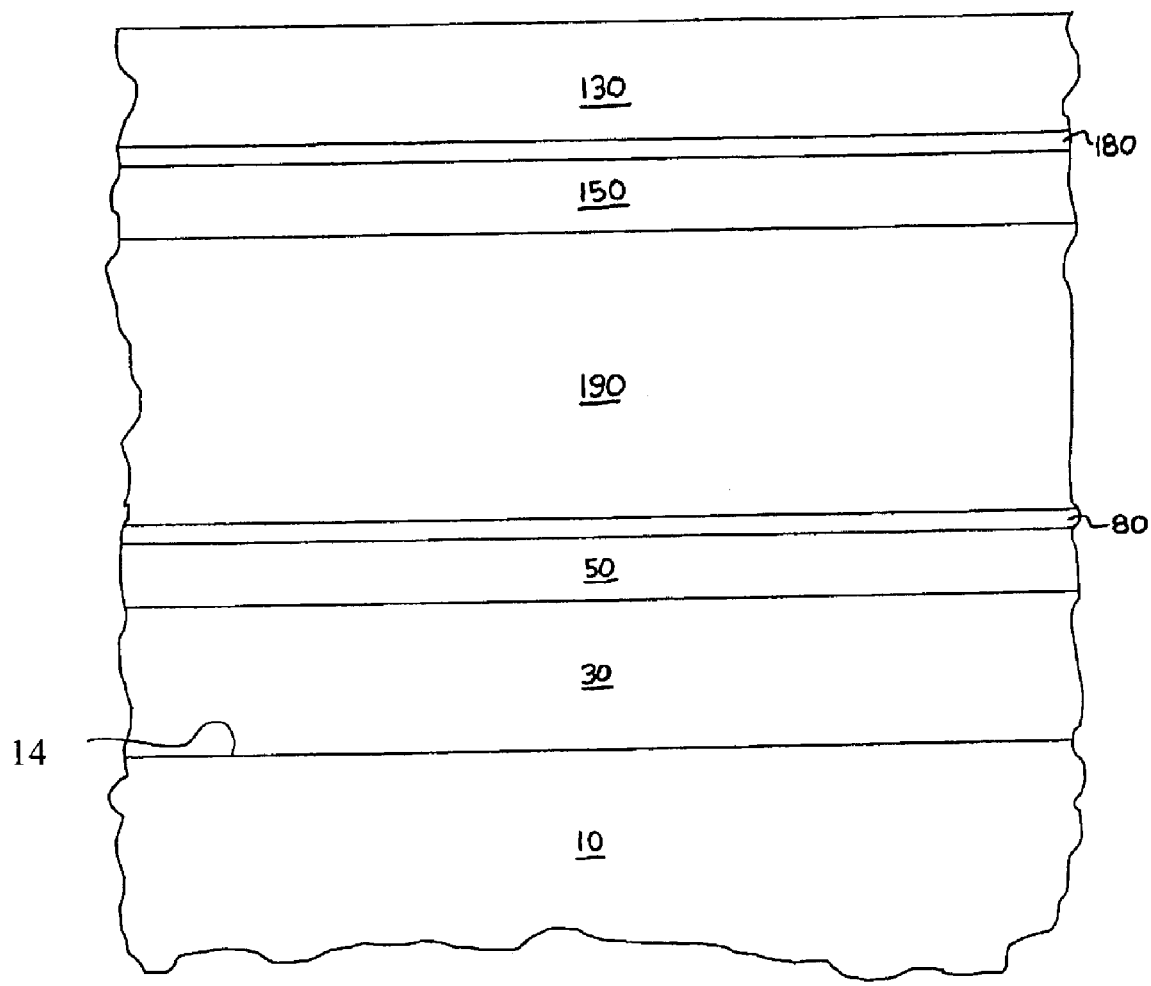
FIG. 2 is a schematic cross-sectional view of a high shading performance coating in accordance with certain embodiments of the invention.

FIG. 2 depicts a preferred high shading performance coating of the invention. As can be appreciated, the coating 40 preferably includes the following films, in sequence outwardly (i.e., away from the substrate), an inner coat 30, a first infrared-reflective layer 50, a first high absorption blocker layer 80, a middle coat 190, a second infrared-reflective layer 150, a second high absorption blocker layer 180, and an outer coat 130. The present disclosure teaches particular combinations of film thicknesses and materials that achieve the exceptional properties described above.

The coating embodiment shown in FIG. 2 includes two infrared-reflective layers 50, 150 (i.e., it is a "double" type low-emissivity coating). The first 50 and second 150 infrared-reflective layers can be formed of any desired infrared-reflective material. Silver is the preferred infrared-reflective material. However, gold, copper, and other infrared-reflective materials can be used. Likewise, alloys or mixtures of these materials can be used. In most cases, it will be preferable to employ silver or silver-containing layers 50, 150. The term "silver containing" is used herein to refer to any film that contains at least some silver. For example, one may provide the infrared-reflective layers 50, 150 in the form of silver combined with a small amount of gold (e.g., about 5% gold or less). Skilled artisans may prefer to utilize a number of other types of silver-containing films. In certain particularly preferred embodiments, though, each infrared-reflective layer consists essentially of silver.

The first 50 and second 150 infrared-reflective layers are preferably provided at particular thicknesses to achieve the properties noted above. The combined thickness of the two infrared-reflective layers 50, 150 is preferably at least about 200 Å, more preferably at least about 210 Å, and perhaps optimally at least about 230 Å. Exceptional properties are obtained when the combined thickness of these two layers 50, 150 is between about 200 Å and about 306 Å, more preferably between about 209 Å and about 293 Å, and perhaps optimally between about 233 Å and about 266 Å. The thickness of each of the infrared-reflective layers 50, 150 is preferably between about 76 Å and about 184 Å, more preferably between about 81 Å and about 176 Å, and perhaps optimally between about 90 Å and about 160 Å. In particular, the first infrared-reflective layer 50 is preferably provided at a thickness of between about 76 Å and about 122 Å, more preferably between about 81 Å and about 112 Å, and perhaps optimally between about 90 Å and about 106 Å. Conjointly, the second infrared-reflective layer 150 is preferably provided at a thickness of between about 119 Å and about 184 Å, more preferably between about 126 Å and about 176 Å, and perhaps optimally between about 140 Å and about 160 Å. The outer infrared-reflective layer 150 in these embodiments is thicker (e.g., by at least 35 Å, and in some case by at least 43 Å, e.g., between 35 Å and 60 Å thicker) than the inner infrared-reflective layer 50, as exemplified in the discussion and examples below of four uniquely preferred film stacks. Forming the first 50 and second 150 infrared-reflective layers of silver at these thicknesses is particularly preferred.

The high shading performance coating 40 preferably includes first 80 and second 180 high absorption blocker layers formed of particular materials at particular thicknesses. The first 80 and second 180 high absorption blocker layers are preferably formed directly over the first 50 and second 150 infrared-reflective layers, respectively. The high absorption blocker layers 80, 180 are preferably thicker than conventional blocker layers. The combined thickness of the two high absorption blocker layers 80, 180 is preferably at least about 70 Å, more preferably at least about 75 Å, and perhaps optimally at least about 80 Å. Exceptional properties are obtained when the combined thickness of these two layers 80, 180 is between about 68 Å and about 115 Å, more preferably between about 72 Å and about 110 Å, and perhaps optimally between about 80 Å and about 100 Å. The thickness of each of the high absorption blocker layers 80, 180 preferably ranges between about 30 Å and about 65 Å, and more preferably between about 35 Å and about 60 Å. In certain embodiments, at least one of the blocker layers 80, 180 has a thickness of greater than 50 Å, as exemplified in the discussion and examples below of four uniquely preferred film stacks. The first high absorption blocker layer 80 preferably has a thickness of between about 38 Å and about 69 Å, more preferably between about 40 Å and about 66 Å, and perhaps optimally between about 45 Å and about 60 Å. Conjointly, the second high absorption blocker layer 180 preferably has a thickness of between about 29 Å and about 63 Å, more preferably between about 31 Å and about 61 Å, and perhaps optimally between about 35 Å and about 55 Å. The inner 80 and outer 180 blocker layers in these embodiments have different thicknesses (e.g., the thickness of the inner blocker layer 80 is, in some cases, at least 5 Å different than the thickness of the outer blocker layer 180). In these embodiments, the thicknesses of the inner 80 and outer 180 blocker layers are 10–20 Å different from each other, as exemplified in the discussion and examples below of four uniquely preferred film stacks.

The first 80 and second 180 high absorption blocker layers preferably comprise either titanium, niobium, or a niobium-titanium material. The term "niobium-titanium" is used herein to refer to any film that contains at least some niobium and at least some titanium. Useful niobium-titanium films and methods for their deposition are described in U.S. patent application Ser. No. 10/123,032, filed on Apr. 11, 2002 and entitled "Thin Film Coating Having Niobium-Titanium Layer", the entire teachings of which are incorporated herein by reference. In preferred embodiments, the first 80 and second 180 high absorption blocker layers each comprise a metallic film (i.e., a film of a metal or metal alloy) selected from the group consisting of titanium, niobium, or niobium-titanium, desirably positioned directly over the first 50 and second 150 infrared-reflective layers, respectively, at the thicknesses described in the preceding paragraph. In particularly preferred embodiments of this nature, the first 80 and second 180 high absorption blocker layers comprise titanium (e.g., are deposited as metallic titanium films).

The high absorption blocker layers 80, 180 serve a number of purposes. For example, these layers 80, 180 protect the underlying infrared-reflective films 50, 150 during the deposition of subsequent films. The high absorption blocker layers 80, 180 preferably comprise a metal or metal alloy that reacts readily with oxygen, nitrogen, or other reactive gas used in depositing subsequent films. This allows the blocker layers 80, 180 to capture reactive oxygen, nitrogen, etc. that would otherwise reach and react with the infrared-reflective films 50, 150. Thus, while the blocker layers 80, 180 are typically deposited as metallic film (i.e., a pure metal film or a metal alloy film), they tend to be somewhat oxidized or nitrided during the deposition of subsequent films. As noted above, by forming the high absorption blocker layers of particular materials at particular thicknesses, and by providing these blocker layers in combination with the described infrared-reflective layers and transparent dielectric layers, exceptional coating properties are achieved.

Certain embodiments of the invention provide a high shading performance coating 40 comprising the following two film sequences: (1) a first silver film/a first titanium, niobium, or niobium-titanium film, and (2) a second silver film/a second titanium, niobium, or niobium-titanium film. Here, the first and second titanium, niobium, or niobium-titanium films are deposited directly upon the first and second silver films, respectively, and at least one of the first and second titanium, niobium, or niobium-titanium films has a thickness of 35 Å or more, more preferably 40 Å or more, and perhaps optimally 45 Å or more. Preferably, the first and second titanium, niobium, or niobium-titanium films in these embodiments have a combined thickness of at least about 70 Å, while the first and second silver films have a combined thickness of at least about 200 Å. In one embodiment of this nature, the combined thickness of the two infrared-reflective films is between about 233 Å and about 266 Å, while the combined thickness of the two blocker layers is between about 80 Å and about 100 Å. In this embodiment, it is desirable to provide an inner coat between the substrate and the first infrared-reflective film, a middle coat between the first high absorption blocker layer and the second infrared-reflective film, and an outer coat further from the substrate than the second high absorption blocker layer, wherein the inner coat has an optical thickness of between about 192 Å and about 290 Å, the middle coat has an optical thickness of between about 1070 Å and about 1410 Å, and the outer coat has an optical thickness of between about 530 Å and about 568 Å.

As depicted in FIG. 2, the high shading performance coating 40 preferably includes an inner coat 30 deposited between the substrate 10 and the first infrared-reflective film 50. The inner coat 30 comprises at least one transparent dielectric film. The term "transparent dielectric" is used herein to refer to any non-metallic (i.e., neither a pure metal nor a metal alloy) compound that includes any one or more metals and is substantially transparent when deposited as a thin film. Included in this definition would be any metal oxide, metal nitride, metal carbide, metal sulfide, metal boride, and any combination thereof (e.g., an oxynitride). Further, the term "metal" should be understood to include all metals and semi-metals (i.e., metalloids). In particular, useful metal oxides include oxides of zinc, tin, indium, bismuth, titanium, hafnium, zirconium, and alloys and mixtures thereof. While metal oxides are advantageous due to their ease and low cost of application, metal nitrides (e.g., silicon nitride, titanium nitride, etc.) can also be used quite advantageously. Skilled artisans will be familiar with other useful transparent dielectric materials.

In some cases, the inner coat 30 is contiguous to the substrate 10. However, the invention also provides embodiments wherein a transparent base layer 20 (not shown) is positioned between the inner coat 30 and the substrate 10. Useful transparent base layers 20 are described in U.S. patent application Ser. No. 10/087,662, the entire teachings of which are incorporated herein by reference.

The inner coat 30 can comprise any of the above-noted transparent dielectric materials. Surprisingly, the outstanding properties of the high shading performance coating 40 are achieved using an inner coat 30 that is exceptionally thin (e.g., less than about 167 Å, in some cases less than about 125 Å, while at the same time having a physical thickness of at least about 75 Å). In particular, the physical thickness of the inner coat 30 is preferably between about 81 Å and about 167 Å, more preferably between about 86 Å and about 161 Å, and perhaps optimally between about 96 Å and about 145 Å. In one particularly preferred embodiment, the inner coat 30 is a single zinc oxide film having a thickness within at least one of the ranges described in this paragraph. In this embodiment, the first infrared-reflective film 50 preferably comprises silver deposited directly upon the zinc oxide inner coat. The first infrared-reflective film 50 desirably is deposited directly over the inner coat 30. Absent an express indication to the contrary, all thicknesses described herein are physical thicknesses.

In certain alternate embodiments (not shown), the inner coat 30 comprises at least two films. The inner coat 30 can be formed of essentially any desired number of films. In certain embodiments, the total optical thickness of the inner coat 30 (whether it consists of one or multiple films) is less than about 334 Å, optionally less than about 300 Å, and in some cases less than about 250 Å, while at the same time having an optical thickness of at least about 150 Å. In particular, the optical thickness of the inner coat preferably is between about 162 Å and about 334 Å, more preferably between about 172 Å and about 322 Å, and perhaps optimally between about 192 Å and about 290 Å. In particularly advantageous embodiments of this nature, each film of the inner coat 30 is a transparent dielectric film having a refractive index of between about 1.7 and about 2.4, and perhaps optimally of about 2.0, optionally with the first infrared-reflective layer positioned directly over the transparent dielectric inner coat 30.

The high shading performance coating 40 is preferably provided with a middle coat 190 positioned between the first high absorption blocker layer 80 and the second infrared-reflective layer 150. The middle coat 190 comprises at least one transparent dielectric film. If so desired, the middle coat 190 can be a single film of one of the above-noted transparent dielectric materials. For example, the middle coat 190 can be a single zinc oxide film. Preferably, though, the middle coat 190 comprises a plurality of transparent dielectric films (not shown). In certain preferred embodiments, the middle coat 190 comprises at least three transparent dielectric films. In some cases, two of these films (e.g., the innermost and outermost) are zinc oxide, while the other (e.g., the middle) is titanium dioxide. Alternatively, two of these films (e.g., the innermost and outermost) can be zinc oxide, while the other (e.g., the middle) is silicon nitride. As still another alternative, two of these films (e.g., the innermost and outermost) can be zinc oxide, while the other (e.g., the middle) is tin oxide. The respective thicknesses of the intermediate films can be varied as desired. Exceptional coating properties are obtained when the overall physical thickness of the middle coat 190 (whether it consists of one or multiple films) is between about 454 Å and about 811 Å, more preferably between about 481 Å and about 776 Å, and perhaps optimally between about 535 Å and about 705 Å. Desirably, the transparent dielectric middle coat 190 is deposited directly over the first high absorption blocker layer 80, which desirably is deposited directly over first infrared-reflective layer 50.

In certain particularly preferred embodiments, the middle coat 190 comprises the following films, in sequence outwardly: a first intermediate zinc oxide film, an intermediate titanium dioxide film, and a second intermediate zinc oxide film. Preferably, these three films form a contiguous sequence. Further, the second infrared-reflective layer 150 preferably comprises silver deposited directly upon the second intermediate zinc oxide film. The respective thicknesses of these three intermediate films can be varied as desired. However, the combined physical thickness of these three films preferably ranges between about 454 Å and about 615 Å, more preferably between about 481 Å and about 589 Å, and perhaps optimally about 535 Å. Conjointly, the combined thickness of the first and second intermediate zinc oxide films preferably ranges between about 387 Å and about 524 Å, more preferably between about 410 Å and about 502 Å, and perhaps optimally is about 456 Å, with the balance of the combined thickness being the intermediate titanium dioxide film (perhaps optimally at about 79 Å). In one particularly preferred embodiment, the first intermediate zinc oxide film has a thickness of about 311 Å, the intermediate titanium dioxide film has a thickness of about 79 Å, and the second intermediate zinc oxide film has a thickness of about 145 Å.

Whether the middle coat 190 consists of one or multiple films, exceptional properties are achieved when the overall optical thickness of the middle coat 190 is between about 908 Å and about 1622 Å, more preferably between about 962 Å and about 1552 Å, and perhaps optimally between about 1070 Å and about 1410 Å. In particularly advantageous embodiments of this nature, each film of the middle coat 190 is a transparent dielectric film having a refractive index of between about 1.7 and about 2.4, and perhaps optimally about 2.0, optionally with the second infrared-reflective layer 150 positioned directly over the transparent dielectric middle coat 190.

In other preferred embodiments (not shown), the middle coat 190 comprises the following sequence of films: a first intermediate zinc oxide film, a first intermediate silicon nitride film, a second intermediate zinc oxide film, a second intermediate silicon nitride film, and a third intermediate zinc oxide film. Preferably, these five films form a contiguous sequence. Further, in these embodiments, the second infrared-reflective layer 150 preferably comprises silver deposited directly upon the third intermediate zinc oxide film. The respective thicknesses of these five intermediate films can be varied as desired. However, the combined physical thickness of these five films preferably ranges between about 522 Å and about 811 Å, more preferably between about 553 Å and about 776 Å, and perhaps optimally between about 615 Å and about 705 Å. In one particularly preferred embodiment, the first intermediate zinc oxide film has a thickness of about 155 Å, the first intermediate silicon nitride film has a thickness of about 50 Å, the second intermediate zinc oxide film has a thickness of about 185 Å, the second intermediate silicon nitride film has a thickness of about 130 Å, and the third intermediate zinc oxide film has a thickness of about 185 Å. In another particularly preferred embodiment, the first intermediate zinc oxide film has a thickness of about 190 Å, the first intermediate silicon nitride film has a thickness of about 85 Å, the second intermediate zinc oxide film has a thickness of about 165 Å, the second intermediate silicon nitride film has a thickness of about 5 Å, and the third intermediate zinc oxide film has a thickness of about 170 Å.

In still other preferred embodiments (not shown), the middle coat 190 comprises the following sequence of films: a first intermediate zinc oxide film, an intermediate tin oxide film, and a second intermediate zinc oxide film. Preferably, these three films form a contiguous sequence. Further, in these embodiments, the second infrared-reflective layer 150 preferably comprises silver deposited directly upon the second intermediate zinc oxide film. The respective thicknesses of these three intermediate films can be varied as desired. However, the combined physical thickness of these three films preferably ranges between about 573 Å and about 776 Å, more preferably between about 607 Å and about 742 Å, and perhaps optimally is about 675 Å. In one particularly preferred embodiment, the first intermediate zinc oxide film has a thickness of about 335 Å, the intermediate tin oxide film has a thickness of about 5 Å, and the second intermediate zinc oxide film has a thickness of about 335 Å.

Thus, the middle coat 190 desirably includes at least two zinc oxide layers between which there is provided at least one layer of a transparent dielectric material that is more durable than zinc oxide (tin oxide, silicon nitride, titanium dioxide, etc.). These embodiments are particularly desirable in terms of low stress, good layer adhesion, chemical durability, and haze formation upon heat treatment. Several embodiments of this nature are exemplified in the present disclosure.

The high shading performance coating 40 is preferably provided with an outer coat 130 positioned further from the substrate 10 than the second high absorption blocker layer 180. The outer coat 130 comprises at least one transparent dielectric film (e.g., of any one or more of the above-noted transparent dielectric materials). Whether the outer coat 130 consists of one or multiple films, the total physical thickness of the outer coat 130 is preferably between about 225 Å and about 327 Å, more preferably between about 238 Å and about 312 Å, and perhaps optimally between about 265 Å and about 284 Å. Desirably, the transparent dielectric outer coat 130 is deposited directly over the second high absorption blocker layer 180, which desirably is deposited directly over the second infrared-reflective layer 150.

In a number of preferred embodiments (not shown), the outer coat 130 comprises at least two films. As with the inner coat 30, the outer coat 130 can be formed of essentially any desired number of films. Exceptional properties are obtained when the total optical thickness of the outer coat 130 (whether it consists of one or multiple films) is between about 450 angstroms and about 654 Å, more preferably between about 476 Å and about 624 Å, and perhaps optimally between about 530 Å and about 568 Å. In certain embodiments, each film of the outer coat 130 is a transparent dielectric film having a refractive index of between about 1.7 and about 2.4, and perhaps optimally of about 2.0.

In certain preferred embodiments, the outer coat 130 comprises two outer films of different transparent dielectric materials. These films can be formed of any of the above-noted transparent dielectric materials. In some cases, these films are contiguous to each another, although this is not required. In one embodiment, the outer coat 130 comprises a first outer layer of zinc oxide positioned over (e.g., directly over) the second high absorption blocker layer 180 and a second outer layer of silicon nitride positioned over (e.g., directly over) the first outer layer of zinc oxide. Preferably, the combined optical thickness of these two outer films is within at least one of the ranges described in the preceding paragraph.

In embodiments wherein the outer coat 130 comprises multiple films, the outermost of these films preferably comprises a chemically-durable material, such as silicon nitride. U.S. Pat. No. 5,834,103, the entire teachings of which are incorporated herein by reference, describes silicon nitride films that can be used as the outermost film in the outer coat 130 of the present coating 40. In certain particularly preferred embodiments, the outermost film of the present coating 40 is silicon nitride deposited at a thickness of between about 29 Å and about 132 Å, more preferably between about 31 Å and about 127 Å, and perhaps optimally between about 35 Å and about 115 Å.

A chemically-durable film of the nature (e.g., of the thickness and composition) just described can advantageously be deposited over (i.e., further from the substrate than) an underlying, outer transparent dielectric film having a thickness of between about 131 Å and about 277 Å, more preferably between about 139 Å and about 265 Å, and perhaps optimally between about 155 Å and about 241 Å. In certain embodiments, this underlying (e.g., directly underlying) transparent dielectric film comprises zinc oxide.

Four uniquely preferred high shading performance film stack 40 embodiments will now be detailed. Each of these film stacks is preferably utilized as a so-called second surface coating. In particular, where one of these film stacks is born on the #2 surface of an IG unit, the resulting unit 8 achieves all of the beneficial properties described above. While the present disclosure focuses somewhat on IG unit embodiments, it is to be understood that the invention extends to any substrate (e.g., a monolithic substrate, such as a glass pane or a flexible film) carrying the present high shading performance coating 40.

A first uniquely preferred high shading performance film stack has the following structure: (1) an inner coat comprising zinc oxide deposited directly upon a glass sheet at a thickness of between about 86 Å about 106 Å, perhaps optimally about 96 Å; (2) a first infrared-reflective layer comprising silver deposited directly upon the inner coat at a thickness of between about 95 Å and about 117 Å, perhaps optimally about 106 Å; (3) a first high absorption blocker layer comprising titanium deposited directly upon the first infrared-reflective layer at a thickness of between about 54 Å and about 66 Å, perhaps optimally about 60 Å, wherein an outer portion of this titanium blocker layer is oxidized during deposition of the overlying zinc oxide film in an oxidizing atmosphere; (4) a first intermediate film comprising zinc oxide deposited directly upon the first high absorption blocker layer at a thickness of between about 279 Å and about 342 Å, perhaps optimally about 311 Å; (5) a second intermediate film comprising titanium dioxide deposited directly upon this zinc oxide at a thickness of between about 71 Å and about 87 Å, perhaps optimally about 79 Å; (6) a third intermediate film comprising zinc oxide deposited directly upon this titanium dioxide at a thickness of between about 130 Å and about 160 Å, perhaps optimally about 145 Å; (7) a second infrared-reflective layer comprising silver deposited directly upon this zinc oxide at a thickness of between about 144 Å and about 176 Å, perhaps optimally about 160 Å; (8) a second high absorption blocker layer comprising titanium deposited directly upon the second infrared-reflective layer at a thickness of between about 36 Å and about 44 Å, perhaps optimally about 40 Å, wherein an outer portion of this titanium blocker layer is oxidized during deposition of the overlying zinc oxide film in an oxidizing atmosphere; (9) a first outer layer comprising zinc oxide deposited directly upon the second high absorption blocker at a thickness of between about 216 Å and about 265 Å, perhaps optimally about 241 Å; and (10) a second outer layer comprising silicon nitride deposited directly upon this zinc oxide at a thickness of between about 38 Å and about 47 Å, perhaps optimally about 43 Å.

A second uniquely preferred high shading performance film stack has the following structure: (1) an inner coat comprising zinc oxide deposited directly upon a glass sheet at a thickness of between about 130 Å and about 160 Å, perhaps optimally about 145 Å; (2) a first infrared-reflective layer comprising silver deposited directly upon the inner coat at a thickness of between about 81 Å and about 99 Å, perhaps optimally about 90 Å; (3) a first high absorption blocker layer comprising titanium deposited directly upon the first infrared-reflective layer at a thickness of between about 40 Å and about 50 Å, perhaps optimally about 45 Å, wherein an outer portion of this titanium blocker layer is oxidized during deposition of the overlying zinc oxide film in an oxidizing atmosphere; (4) a first intermediate layer comprising zinc oxide deposited directly upon the first high absorption blocker layer at a thickness of between about 171 Å and about 209 Å, perhaps optimally about 190 Å; (5) a second intermediate layer comprising silicon nitride deposited directly upon this zinc oxide at a thickness of between about 76 Å and about 94 Å, perhaps optimally about 85 Å; (6) a third intermediate layer comprising zinc oxide deposited directly upon this silicon nitride at a thickness of between about 148 Å and about 182 Å, perhaps optimally about 165 Å; (7) a fourth intermediate layer comprising silicon nitride deposited directly upon this zinc oxide at a thickness of between about 4 Å and about 6 Å, perhaps optimally about 5 Å; (8) a fifth intermediate layer comprising zinc oxide deposited directly upon this silicon nitride at a thickness of between about 153 Å and about 187 Å, perhaps optimally about 170 Å; (9) a second infrared-reflective layer comprising silver deposited directly upon this zinc oxide at a thickness of between about 128 Å and about 157 Å, perhaps optimally about 143 Å; (10) a second high absorption blocker layer comprising titanium deposited directly upon the second infrared-reflective layer at a thickness of between about 49 Å and about 61 Å, perhaps optimally about 55 Å, wherein an outer portion of this titanium blocker layer is oxidized during deposition of the overlying zinc oxide film in an oxidizing atmosphere; (11) a first outer layer comprising zinc oxide deposited directly upon the second high absorption blocker layer at a thickness of between about 171 Å and about 209 Å, perhaps optimally about 190 Å; and (12) a second outer layer comprising silicon nitride deposited directly upon this zinc oxide at a thickness of between about 67 Å and about 83 Å, perhaps optimally about 75 Å.

A third uniquely preferred high shading performance film stack has the following structure: (1) an inner coat comprising zinc oxide deposited directly upon a glass sheet at a thickness of between about 108 Å and about 132 Å, perhaps optimally about 120 Å; (2) a first infrared-reflective layer comprising silver deposited directly upon this zinc oxide layer at a thickness of between about 81 Å and about 99 Å, perhaps optimally about 90 angstroms; (3) a first high absorption blocker layer comprising titanium deposited directly upon the first infrared-reflective layer at a thickness of between about 40 Å and about 50 Å, perhaps optimally about 45 Å, wherein an outer portion of this titanium blocker layer is oxidized during deposition of the overlying zinc oxide film in an oxidizing atmosphere; (4) a first intermediate layer comprising zinc oxide deposited directly upon the first high absorption blocker layer at a thickness of between about 301 Å and about 369 Å, perhaps optimally about 335 Å; (5) a second intermediate layer comprising tin oxide deposited directly upon this zinc oxide at a thickness of between about 4 Å and about 6 Å, perhaps optimally about 5 Å; (6) a third intermediate layer comprising zinc oxide deposited directly upon this tin oxide at a thickness of between about 301 Å and about 369 Å, perhaps optimally about 335 Å; (7) a second infrared-reflective layer comprising silver deposited directly upon this zinc oxide at a thickness of between about 135 Å and about 165 Å, perhaps optimally about 150 Å; (8) a second high absorption blocker layer comprising titanium deposited directly upon the second infrared-reflective layer at a thickness of between about 49 Å and about 61 Å, perhaps optimally about 55 Å, wherein an outer portion of this titanium blocker layer is oxidized during deposition of the overlying zinc oxide film in an oxidizing atmosphere; (9) a first outer layer comprising zinc oxide deposited directly upon the second high absorption blocker layer at a thickness of between about 216 Å and about 264 Å, perhaps optimally about 240 Å; and (12) a second outer layer comprising silicon nitride deposited directly upon this zinc oxide layer at a thickness of between about 31 Å and about 39 Å, perhaps optimally about 35 Å.

A fourth uniquely preferred high shading performance film stack has the following structure: (1) an inner coat comprising zinc oxide deposited directly upon a glass sheet at a thickness of between about 99 Å and about 121 Å, perhaps optimally about 110 Å; (2) a first infrared-reflective layer deposited directly upon the inner coat at a thickness of between about 94 Å and about 116 Å, perhaps optimally about 105 Å; (3) a first high absorption blocker layer comprising titanium deposited directly upon the first infra-red-reflective layer at a thickness of between about 40 Å and about 50 Å, perhaps optimally about 45 Å, wherein an outer portion of this titanium blocker layer is oxidized during deposition of the overlying zinc oxide film in an oxidizing atmosphere; (4) a first intermediate layer comprising zinc oxide deposited directly upon the first high absorption blocker layer at a thickness of between about 139 Å and about 171 Å, perhaps optimally about 155 Å; (5) a second intermediate layer comprising silicon nitride deposited directly upon this zinc oxide at a thickness of between about 45 Å and about 55 Å, perhaps optimally about 50 Å; (6) a third intermediate layer comprising zinc oxide deposited directly upon this silicon nitride at a thickness of between about 166 Å and about 204 Å, perhaps optimally about 185 Å; (7) a fourth intermediate layer comprising silicon nitride deposited directly upon this zinc oxide at a thickness of between about 117 Å and about 143 Å, perhaps optimally about 130 Å; (8) a fifth intermediate layer comprising zinc oxide deposited directly upon this silicon nitride at a thickness of between about 166 Å and about 204 Å, perhaps optimally about 185 Å; (9) a second infrared-reflective layer comprising silver deposited directly upon this zinc oxide at a thickness of between about 126 Å and about 154 Å, perhaps optimally about 140 Å; (10) a second high absorption blocker layer comprising titanium deposited directly upon the second infrared-reflective layer at a thickness of between about 31 Å and about 39 Å, perhaps optimally about 35 Å, wherein an outer portion of this titanium blocker layer is oxidized during deposition of the overlying zinc oxide film in an oxidizing atmosphere; (11) a first outer layer comprising zinc oxide deposited directly upon the second high absorption blocker layer at a thickness of between about 139 Å and about 171 Å, perhaps optimally about 155 Å; and (12) a second outer layer comprising silicon nitride deposited directly upon this zinc oxide at a thickness of between about 103 Å and about 127 Å, perhaps optimally about 115 Å.

The exceptional optical properties of the present coating 40 are due in part to the relative optical thicknesses of the inner coat 30, the middle coat 190, and the outer coat 130. For example, in certain embodiments, there is provided a specific ratio of the optical thickness of the inner coat 30 relative to the optical thickness of the middle coat 190. Additionally or alternatively, there can be provided a specific ratio of the optical thickness of the outer coat 130 relative to the optical thickness of the middle coat 190.

In certain embodiments, the ratio of optical thickness of the inner coat 30 to the optical thickness of the middle coat 190 is between about 0.12 and about 0.20, desirably is between about 0.13 and about 0.19, and in some cases is about 0.14–0.18. Further, in certain embodiments, the ratio of the optical thickness of the outer coat 130 to the optical thickness of the middle coat 190 is between about 0.30 and about 0.60, desirably is between about 0.34 and about 0.56, and in some cases is about 0.38–0.54. In some cases, the coating 40 has one of the foregoing ratios of inner coat/middle coat as well as one of the foregoing ratios of outer coat/middle coat.

Figure 3:
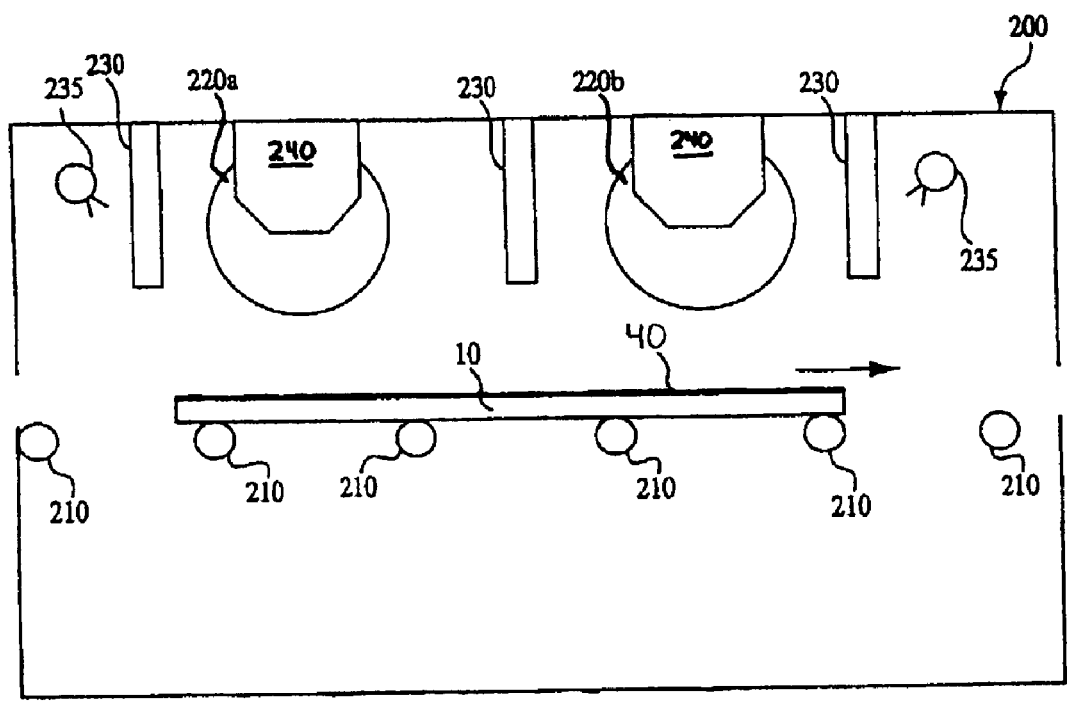
FIG. 3 is a schematic side view of a sputtering chamber that has utility in certain methods of the invention.

The present high shading performance coatings 40 can be applied by a variety of well known coating techniques. For example, these coatings can be applied by sputter deposition (i.e., sputtering). Sputtering is well known in the present art. FIG. 3 depicts an exemplary magnetron sputtering chamber 200. Magnetron sputtering chambers and related equipment are commercially available from a variety of sources (e.g., Leybold and BOC Coating Technology). Useful magnetron sputtering techniques and equipment are also described in U.S. Pat. No. 4,166,018, issued to Chapin, the entire teachings of which are incorporated herein by reference.

In favored methods of the invention, the high shading performance coating 40 is applied to a substrate 10 in a multiple-chamber sputtering line. Sputtering lines are well known in the present art. A typical sputtering line includes a series of sputtering chambers that are aligned and connected such that a sheet-like substrate 10 can be passed from one chamber to the next by conveying the substrate 10 horizontally over spaced-apart transport rollers 210 in each of the chambers. Thus, the rollers 210 form a continuous path of substrate 10 travel through the sputtering line. The substrate 10 is typically conveyed at speeds of between about 100–500 inches per minute.

In one particular deposition method, the substrate 10 is positioned at the inlet of the sputtering line and conveyed into a first coat zone. The first coat zone is provided with three cathodes adapted to deposit the inner coat 30. All three of these cathodes comprise zinc sputtering targets. In more detail, each cathode comprises a planar zinc sputtering target. The zinc targets 240 in the first coat zone are sputtered in an oxidizing atmosphere to deposit a zinc oxide inner coat 30. This oxidizing atmosphere may consist essentially of oxygen (e.g., about 100% $O_2$). Alternatively, this atmosphere may comprise $Ar/O_2$ (e.g., at about 3.5 mbar). A power of about 37 kW is applied to the first zinc target, while a power of about 8 kW is applied to the second zinc target, and a power of about 36 kW is applied to the third zinc target. The substrate 10 is conveyed beneath all three of these zinc targets at a rate of about 450 inches per minute, while sputtering each of the zinc targets at the described power level, such that a zinc oxide inner coat 30 is applied at a thickness of about 96 Å.

The substrate 10 is then conveyed into a second coat zone where the first infrared-reflective layer 50 and the first high absorption blocker layer 80 are deposited. This coat zone preferably contains an inert atmosphere (e.g., argon at about 4 mbar).

The first sputtering bay of this coat zone has a planar silver target. A power of about 10 kW is applied to this silver target, while the substrate 10 is conveyed beneath this target at about 450 inches per minute, to deposit the first infrared-reflective silver layer 50 directly over the zinc oxide inner coat 30 at a thickness of about 106 Å. The second sputtering bay of this coat zone has a planar titanium target. A power of about 30 kW is applied to this titanium target, while the substrate 10 is conveyed beneath this target at a rate of about 450 inches per minute, to deposit the first high absorption titanium blocker layer at a thickness of about 60 Å. The substrate 10 is then conveyed through four subsequent coat zones to deposit the middle coat 190, as will now be described.

The thus coated substrate is conveyed through a third coat zone having three sputtering bays each with a planar zinc target, and then through a fourth coat zone also having three sputtering bays each with a planar zinc target. All six of these targets are sputtered in an oxidizing atmosphere to deposit the innermost portion of the middle coat 190. The substrate 10 is conveyed beneath all six of these targets at a rate of about 450 inches per minute, while a power of about 49 kW is applied to the first zinc target, a power of about 43 kW is applied to the second zinc target, a power of about 42 kW is applied to the third zinc target, a power of about 44 kW is applied to the fourth zinc target, a power of about 42 kW is applied to the fifth zinc target, and a power of about 43 kW is applied to the sixth zinc target. This results in the deposition of about 311 Å of zinc oxide directly upon the first high absorption titanium blocker layer 80.

The thus coated substrate is then conveyed into a fifth coat zone having three sputtering bays each with two cylindrical (rotatable) substoichiometric titanium oxide targets. Useful substoichiometric titanium oxide targets are described in U.S. patent application Ser. Nos. 09/024,071, 09/024,240, 09/044,681, 09/101,405, and 09/589,098, the entire teachings of each of which are incorporated herein by reference. This fifth coat zone preferably contains an oxidizing atmosphere comprising argon and enough oxygen to completely oxidize the titanium dioxide being deposited. A power of about 55 kW is applied to the first pair of these targets, while a power of about 24 kW is applied to the second pair of these targets, and a power of about 76 kW is applied to the third pair of these targets. By conveying the substrate 10 beneath these six targets, while sputtering the targets at the described power level, titanium dioxide is applied at a thickness of about 79 Å directly over the underlying zinc oxide.

The thus coated substrate is then conveyed into a sixth coat zone wherein the outermost portion of the middle coat 190 is applied. The sixth coat zone has three sputtering bays each with a planar zinc target. This coat zone contains an oxidizing atmosphere, as described above (e.g., with reference to the inner coat 30). A power of about 41 kW is applied to the first target, while a power of about 40 kW is applied to the second target, and a power of about 41 kW is applied to the third target. By conveying the substrate 10 beneath these targets at about 450 inches per minute, while sputtering each target at the described power level, zinc oxide is applied at a thickness of about 145 Å directly over the underlying titanium dioxide. This 145 Å of zinc oxide forms the outermost portion of the middle coat 190.

The substrate 10 is then conveyed into a seventh coat zone wherein the second infrared-reflective film 150 and the second high absorption blocker layer 180 are deposited. This seventh coat zone preferably contains an inert atmosphere (described above). The first two sputtering bays of this coat zone each have a planar silver target. A power of about 8 kW is applied to the first silver target, and a power of about 7 kW is applied to the second silver target. By conveying the substrate beneath these targets at about 450 inches per minute, while sputtering each target at the described power level, the second infrared-reflective silver layer 150 is deposited at a thickness of about 160 Å. The third sputtering bay of this coat zone has a planar titanium target. A power of about 20 kW is applied to this titanium target, while the substrate 10 is conveyed beneath this target at a rate of about 450 inches per minute, to deposit the second high absorption titanium blocker layer 180 at a thickness of about 40 Å. The substrate 10 is then conveyed through three more active coat zones to deposit the outer coat 130, as will now be described.

The thus coated substrate is conveyed through two coat zones that are used to deposit the innermost portion of the outer coat 130. These two coat zones contain six planar zinc targets and an oxidizing atmosphere (as described above). A power of about 32 kW is applied to the first zinc target, a power of about 32 kW is applied to the second zinc target, a power of about 34 kW is applied to the third zinc target, a power of about 17 kW is applied to the fourth zinc target, a power of about 34 kW is applied to the fifth zinc target, and a power of about 32 kW is applied to the sixth zinc target. By conveying the substrate 10 beneath these six targets at a rate of about 450 inches per minute, while sputtering the targets at the described power level, zinc oxide can be applied at a thickness of about 241 Å directly over the second high absorption blocker layer 180.

The thus coated substrate is then conveyed into a final coat zone that is used to deposit the outermost portion of the outer coat 130. This coat zone contains three sputtering bays each having a cylindrical silicon target. A nitriding atmosphere is preferably maintained in this coat zone during sputtering. For example, this atmosphere can be nitrogen at a pressure of about 3.5–5 mbar. A power of about 20 kW is applied to the first silicon target, while a power of about 21 kW is applied to the second silicon target, and a power of about 24 kW is applied to the third silicon target. By conveying the substrate 10 beneath these targets at a rate of about 450 inches per minute, while sputtering each target at the described power level, silicon nitride is deposited at a thickness of about 43 angstroms directly over the underlying zinc oxide. This completes the high shading performance coating 40 of one particular embodiment.

While preferred embodiments of the present invention have been described, it should be understood that numerous changes, adaptations, and modifications can be made therein without departing from the spirit of the invention and the scope of the appended claims.

What is claimed is:

1. A transparent substrate bearing a high shading performance, low-emissivity coating comprising, in sequence outwardly:
   (a) a first infrared-reflective film having a thickness of between about 76 Å and about 122 Å;
   (b) a first high absorption blocker layer positioned directly over the first infrared-reflective film, the first high absorption blocker layer comprising a metallic film selected from the group consisting of niobium, titanium, and niobium-titanium, wherein the first high absorption blocker layer has a thickness of between about 38 Å and about 69 Å;
   (c) a second infrared-reflective film having a thickness of between about 119 Å and about 184 Å; and
   (d) a second high absorption blocker layer positioned directly over the second infrared-reflective film, the second high absorption blocker layer comprising a metallic film selected from the group consisting of niobium, titanium, niobium-titanium, wherein the second high absorption blocker layer has a thickness of between about 29 Å and about 63 Å, wherein the first and second high absorption blocker layers have a combined thickness of at least 70 Å, the coating comprising an inner coat between the substrate and the first infrared-reflective film, the inner coat having an optical thickness and comprising at least one transparent dielectric film, the coating comprising a middle coat between the first high absorption blocker layer and the second infrared-reflective film, the middle coat having an optical thickness and comprising at least one transparent dielectric film, wherein the coating has a ratio defined as the optical thickness of the inner coat divided by the optical thickness of the middle coat, said ratio being between about 0.12 and about 0.2.

2. The transparent substrate of claim 1 wherein the first and second infrared-reflective films have a combined thickness of between about 209 Å and about 293 Å.

3. The transparent substrate of claim 1 wherein the combined thickness of the first and second high absorption blocker layers is between 72 Å and about 110 Å.

4. The transparent substrate of claim 1 wherein the first and second infrared-reflective films have a combined thickness of between about 233 Å and about 266 Å, and the combined thickness of the first and second high absorption blocker layers is between 80 Å and 100 Å.

5. The transparent substrate of claim 1 wherein the optical thickness of the inner coat is less than about 334 Å.

6. The transparent substrate of claim 1 wherein the optical thickness of the inner coat is between about 172 Å and about 322 Å.

7. The transparent substrate of claim 1 wherein the optical thickness of the middle coat is between about 962 Å and about 1552 Å.

8. The transparent substrate of claim 1 wherein the coating comprises an outer coat further from the substrate than the second high absorption blocker layer, the outer coat comprising at least one transparent dielectric film.

9. The transparent substrate of claim 8 wherein the outer coat has an optical thickness of between about 476 Å and about 624 Å.

10. The transparent substrate of claim 4 wherein the coating includes an outer coat further from the substrate than the second high absorption blocker layer, wherein the optical thickness of the inner coat is between about 192 Å and about 290 Å, the optical thickness of the middle coat is between about 1070 Å and about 1410 Å, and the outer coat has an optical thickness of between about 530 Å and about 568 Å.

11. The transparent substrate of claim 1 wherein the coating has an emissivity of less than about 0.08.

12. The transparent substrate of claim 1 wherein the thickness of the first high absorption blocker layer is at least 5 Å different than the thickness of the second high absorption blocker layer.

13. The transparent substrate of claim 1 wherein at least one of the first and second high absorption blocker layers has a physical thickness of greater than 50 Å.

14. The transparent substrate of claim 1 wherein the inner coat has a physical thickness of less than about 167 Å.

15. The transparent substrate of claim 1 wherein the inner coat is positioned directly over the substrate, wherein each film of the inner coat is a transparent dielectric film having a refractive index of between about 1.7 and about 2.4, and wherein the first infrared-reflective film is positioned directly over the inner coat.

16. The transparent substrate of claim 1 wherein the transparent substrate bearing the high shading performance, low-emissivity coating has a maximum transmission in the visible range, said maximum transmission being less than 50%.

17. An insulating glass unit comprising first and second panes held in a spaced-apart configuration, the panes having confronting inner surfaces oriented toward a between-pane space and opposed outer surfaces oriented away from the between-pane space, wherein one of said inner surfaces bears a high shading performance, low-emissivity coating comprising first and second infrared-reflective films and first and second high absorption blocker layers positioned respectively directly over said first and second infrared-reflective films, wherein the first and second high absorption blocker layers have a combined thickness of at least 70 Å, wherein each of the high absorption blocker layers comprises a metallic film selected from the group consisting of niobium, titanium, and niobium-titanium, and wherein the insulating glass unit has a total visible transmittance of between about 0.36 and about 0.44 and an exterior reflected color characterized by an $a_h$, color coordinate of between about −0.75 and about −3.25 and a $b_h$ color coordinate of between about −2.25 and about −4.75, the coating comprising an inner coat positioned directly over said one of said inner surfaces, wherein the inner coat comprises at least one transparent dielectric film, and wherein each film of the inner coat is a transparent dielectric film having a refractive index of between about 1.7 and about 2.4, the first infrared-reflective film being positioned directly over the inner coat.

18. The insulating glass unit of claim 17 wherein the coating has an emissivity of less than about 0.08.

19. The insulating glass unit of claim 17 wherein the insulating glass unit has an exterior visible reflectance of less than about 15%.

20. The insulating glass unit of claim 17 wherein the first infrared-reflective film has a thickness of between about 76 Å and about 122 Å, the first high absorption blocker layer has a thickness of between about 38 Å and about 69 Å, the second infrared-reflective film has a thickness of between about 119 Å and about 184 Å, and the second high absorption blocker layer has a thickness of between about 29 Å and about 63 Å.

21. The insulating glass unit of claim 20 wherein the first and second infrared-reflective films have a combined thickness of between about 233 Å and about 266 Å, and the combined thickness of the first and second high absorption blocker layers is between 80 Å and 100 Å.

22. The insulating glass unit of claim 21 wherein the coating comprises, in sequence outwardly: (a) the inner coat; (b) the first infrared-reflective film; (c) the first high absorption blocker layer; (d) a middle coat comprising at least one transparent dielectric film; (e) the second infrared-reflective film; (f) the second high absorption blocker layer; and (g) an outer coat comprising at least one transparent dielectric film.

23. The insulating glass unit of claim 22 wherein the inner coat has an optical thickness of between about 192 Å and about 290 Å, the middle coat has an optical thickness of between about 1070 Å and about 1410 Å, and the outer coat has an optical thickness of between about 530 Å and about 568 Å.

24. The insulating glass unit of claim 17 wherein the first high absorption blocker layer has a thickness that is at least 5 Å different than a thickness of the second high absorption blocker layer.

25. The insulating glass unit of claim 17 wherein at least one of the first and second high absorption blocker layers has a physical thickness of greater than 50 Å.

26. The insulating glass unit of claim 17 wherein the inner coat has a physical thickness of less than about 167 Å.

27. The insulating glass unit of claim 17 wherein the insulating glass unit has a solar heat gain coefficient of between about 0.3 and about 0.25.

28. An insulating glass unit comprising first and second panes held in a spaced-apart configuration, the panes having confronting inner surfaces oriented toward a between-pane space and opposed outer surfaces oriented away from the between-pane space, wherein one of said inner surfaces bears a high shading performance, low-emissivity coating comprising first and second infrared-reflective films and first and second high absorption blocker layers positioned respectively directly over said first and second infrared-reflective films, wherein each of the high absorption blocker layers comprises a metallic film selected from the group consisting of niobium, titanium, and niobium-titanium, wherein the first and second high absorption blocker layers have a combined thickness of at least 70 Å, and wherein the insulating glass unit has a solar heat gain coefficient of less than about 0.3, the coating comprising an inner coat between said one of said inner surfaces and the first infrared-reflective film, the inner coat having an optical thickness and comprising at least one transparent dielectric film, the coating comprising a middle coat between the first high absorption blocker layer and the second infrared-reflective film, the middle coat having an optical thickness and comprising at least one transparent dielectric film, wherein the coating has a ratio defined as the optical thickness of the inner coat divided by the optical thickness of the middle coat, said ratio being between about 0.12 and about 0.2.

29. The insulating glass unit of claim 28 wherein the solar heat gain coefficient is less than about 0.27.

30. The insulating glass unit of claim 28 wherein the coating has an emissivity of less than about 0.08.

31. The insulating glass unit of claim 28 wherein the insulating glass unit has an exterior visible reflectance of less than about 18%.

32. The insulating glass unit of claim 31 wherein the exterior visible reflectance is less than about 15%.

33. The insulating glass unit of claim 28 wherein the insulating glass unit has an exterior reflected color characterized by an $a_h$ color coordinate of between about −0.75 and about −3.25 and a $b_h$ color coordinate of between about −2.25 and about −4.75.

34. The insulating glass unit of claim 28 wherein the first infrared-reflective film has a thickness of between about 76

Å and about 122 Å, the first high absorption blocker layer has a thickness of between about 38 Å and about 69 Å, the second infrared-reflective film has a thickness of between about 119 Å and about 184 Å, and the second high absorption blocker layer has a thickness of between about 29 Å and about 63 Å.

35. The insulating glass unit of claim 34 wherein the first and second infrared-reflective films have a combined thickness of between about 233 Å and about 266 Å, and the combined thickness of the first and second high absorption blocker layers is between 80 Å and 100 Å.

36. The-insulating glass unit of claim 35 wherein the coating comprises, in sequence outwardly: (a) the inner coat; (b) the first infrared-reflective film; (c) the first high absorption blocker layer; (d) the middle coat; (e) the second infrared-reflective film; (f) the second high absorption blocker layer; and (g) an outer coat comprising at least one transparent dielectric film.

37. The insulating glass unit of claim 36 wherein the optical thickness of the inner coat is between about 192 Å and about 290 Å, the optical thickness of the middle coat is between about 1070 Å and about 1410 Å, and the outer coat has an optical thickness of between about 530 Å and about 568 Å.

38. The insulating glass unit of claim 28 wherein the first high absorption blocker layer has a thickness that is at least 5 Å different than a thickness of the second high absorption blocker layer.

39. The insulating glass unit of claim 28 wherein at least one of the first and second high absorption blocker layers has a physical thickness of greater than 50 Å.

40. The insulating glass unit of claim 28 wherein the inner coat has a physical thickness of less than about 167 Å.

41. The insulating glass unit of claim 28 wherein the inner coat is positioned directly over said one of said inner surfaces, wherein each film of the inner coat is a transparent dielectric film having a refractive index of between about 1.7 and about 2.4, and wherein the first infrared-reflective film is positioned directly over the inner coat.

42. The insulating glass unit of claim 28 wherein the solar heat gain coefficient is between about 0.3 and about 0.25.

43. The insulating glass unit of claim 28 wherein the insulating glass unit has a total visible transmittance of between about 0.36 and about 0.44.

44. An insulating glass unit comprising first and second panes held in a spaced-apart configuration, the panes having confronting inner surfaces oriented toward a between-pane space and opposed outer surfaces oriented away from the between-pane space, wherein one of said inner surfaces bears a high shading performance, low-emissivity coating comprising first and second infrared-reflective films and first and second high absorption blocker layers positioned respectively over said first and second infrared-reflective films, wherein the first and second high absorption blocker layers have a combined thickness of at least 70 angstroms, the coating comprising an inner coat positioned directly over said one of said inner surfaces, wherein the inner coat comprises at least one transparent dielectric film, wherein each film of the inner coat is a transparent dielectric film having a refractive index of between about 1.7 and about 2.4, the first infrared-reflective film being positioned directly over the inner coat, and the coating comprising a middle coat positioned between the first and second infrared-reflective films, the middle coat having an optical thickness and comprising at least one transparent dielectric film, wherein the coating has a ratio defined as the optical thickness of the inner coat divided by the optical thickness of the middle coat, said ratio being between about 0.12 and about 0.2, wherein the insulating glass unit has a total visible transmittance of between about 0.36 and about 0.44 and an exterior reflected color characterized by an $a_h$ color coordinate of between about −0.75 and about −3.25 and a $b_h$ color coordinate of between about −2.25 and about −4.75.

* * * * *